(12) United States Patent
Heim et al.

(10) Patent No.: US 6,806,621 B2
(45) Date of Patent: Oct. 19, 2004

(54) ELECTROACTIVE POLYMER ROTARY MOTORS

(75) Inventors: Jon Heim, Pacifica, CA (US); Ronald E. Pelrine, Boulder, CO (US); Roy D. Kornbluh, Palo Alto, CA (US); Joseph Stephen Eckerle, Redwood City, CA (US)

(73) Assignee: SRI International, Menlo Park, CA (US)

( * ) Notice: Subject to any disclaimer, the term of this patent is extended or adjusted under 35 U.S.C. 154(b) by 171 days.

(21) Appl. No.: 10/090,430

(22) Filed: Feb. 28, 2002

(65) Prior Publication Data

US 2002/0185937 A1 Dec. 12, 2002

Related U.S. Application Data

(60) Provisional application No. 60/273,108, filed on Mar. 2, 2001.

(51) Int. Cl.[7] ................................................ H01L 41/08
(52) U.S. Cl. ........................ 310/328; 310/339; 310/800
(58) Field of Search ................................ 310/328, 339, 310/800

(56) References Cited

U.S. PATENT DOCUMENTS

| | | | | |
|---|---|---|---|---|
| 3,056,932 A | * | 10/1962 | Wood | 331/185 |
| 3,463,942 A | * | 8/1969 | Mellon | 310/329 |
| 3,539,841 A | * | 11/1970 | Riff | 310/339 |
| 4,227,347 A | | 10/1980 | Tam | |
| 4,236,416 A | | 12/1980 | Barcita | |
| 4,240,535 A | | 12/1980 | Pierce et al. | |
| 4,885,783 A | | 12/1989 | Whitehead et al. | |
| 5,761,782 A | | 6/1998 | Sager | |
| 5,977,685 A | | 11/1999 | Kurita et al. | |
| 6,060,811 A | | 5/2000 | Fox et al. | |
| 6,069,420 A | | 5/2000 | Mizzi et al. | |
| 6,084,321 A | | 7/2000 | Hunter et al. | |
| 6,184,608 B1 | | 2/2001 | Cabuz et al. | |
| 6,184,609 B1 | | 2/2001 | Johansson et al. | |
| 6,194,815 B1 | * | 2/2001 | Carroll | 310/339 |
| 6,249,076 B1 | | 6/2001 | Madden et al. | |
| 6,429,576 B1 | * | 8/2002 | Simes | 310/339 |

FOREIGN PATENT DOCUMENTS

| | | |
|---|---|---|
| WO | WO 01/06579 | 1/2001 |
| WO | WO 01/58973 | 8/2001 |

OTHER PUBLICATIONS

Roy D. Kornbluh, Robotic Systems, Ocean Engineering and Marine Systems, 2000 Program, Jan. 2001, Office of Naval Research Public Release, ONR–32100–1.

Roy D. Kornbluh, Robotic Systems, Ocean Engineering and Marine Systems, 1999 Program, Feb. 2000, Office of Naval Research Public Release, ONR 32100–2.

Roy D. Kornbluh, Robotic Systems, Ocean Engineering and Marine Systems, 1998 Program, Feb. 1999 Office of Naval Research Public Release, ONR 32199–4.

Roy D. Kornbluh, Robotic Systems, Ocean Engineering and Marine Systems 1997 Program, Dec. 1997, Office of Naval Research Public Release, ONR 32198–2.

(List continued on next page.)

*Primary Examiner*—Mark Budd
(74) *Attorney, Agent, or Firm*—Beyer, Weaver & Thomas LLP

(57) ABSTRACT

The present invention relates to mechanical-electrical power conversion systems. The systems comprise one or more electroactive polymers that convert between electrical and mechanical energy. When a voltage is applied to electrodes contacting an electroactive polymer, the polymer deflects. This deflection may be converted into rotation of a power shaft included in a motor. Repeated deflection of the polymer may then produce continuous rotation of the power shaft.

53 Claims, 17 Drawing Sheets

OTHER PUBLICATIONS

Bar–Cohen, Yoseph, JPL, *Worldwide Electroactive Polymers,* EAP (Artificial Muscles) Newsletter, vol. 3, No. 1, Jun. 2001.

Baughman, R.H., L.W. Shacklette, and R.L. Elsenbaumer, E. Plichta, and C. Becht, "Mico electromechanical actuators based on conducting polymers", in Molecular Electronics, Materials and Methods, P.I. Lazarev (ed.), Kluwer Academic Publishers, pp. 267–289 (1991).

Brock, D. L., "Review of Artificial Muscle based on Contractile Polymers," MIT Artificial Intelligence Laboratory, A.I. Memo No. 1330, Nov. 1991.

Caldwell, D., G. Medrano–Cerda, and M. Goodwin, "Characteristics and Adaptive Control of Pneumatic Muscle Actuators for a Robotic Elbow," Proc. IEEE Int. Conference on Robotics and Automation, San Diego, California (May 8–13, 1994).

De Rossi, D., and P. Chiarelli. 1994. "Biomimetic Macromolecular Actuators," *Macro–Ion Characterization, American Chemical Society Symposium Series,* vol. 548, Ch. 40, pp. 517–530.

Dowling, K., *Beyond Faraday–Non Traditional Actuation,* available on the World Wide Web at http://www.frc.ri.cmu.edu/~nivek/OTH/beyond–faraday/beyondfaraday.html, 9 pages, 1994.

Flynn, Anita M., L.S. Tavrow, S.F. Bart, R.A. Brooks, D.J. Ehrlich, K.R. Udayakumar, and L.E. Cross. 1992. "Piezoelectric Micromotors for Microrobots," *IEEE Journal of Microelectromechanical Systems,* vol. 1, No. 1, pp. 44–51 (Mar. 1992); also published as *MIT AI Laboratory Memo 1269,* Massachusetts Institute of Technology (Feb. 1991).

Hirose, S., Biologically Inspired Robots: Snake–like Locomotors and Manipulators, *"Development of the ACM as a Manipulator",* Oxford University Press, New York, 1993, pp. 170–172.

Jacobsen, S., Price, R., Wood, J, Rytting, T., and Rafaelof, M., "A Design Overview of an Eccentric–Motion Electrostatic Microactuator (the Wobble Motor)", *Sensors and Actuators,* 20 (1989) pp. 1–16.

Kornbluh, R., G. Andeen, and J. Eckerle, "Artificial Muscle: The Next Generation of Robotic Actuators," presented at the Fourth World Wide Conference on Robotics Research, SME Paper M591–331, Pittsburgh, PA, Sep. 17–19, 1991.

Kornbluh, R., Pelrine, R., Eckerie, J., Joseph, J., "Electrostrictive Polymer Artificial Muscle Actuators", IEEE International Conference on Robotics and Automation, Leuven, Belgium, 1998.

Ford, V. and J. Kievet, "Technical Support Package on Traveling–Wave Rotary Actuators" NASA Tech Brief vol. 21, No. 10, Item #145, from JPL New Technology Report NPO–19261, Oct. 1997. pg,6

Kornbluh, R. D and R. E. Pelrine, "Dexterous Multiarticulated Manipulator with Electrostrictive Polymer Artificial Muscle," ITAD–7247–QR–96–175, SRI Project No. 7247, Prepared for: Office of Naval Research, Nov. 1996.

Lang, J, M. Schlect, and R. Howe, "Electric Micromotors: Electromechanical Characteristics," Proc. IEEE Micro Robots and Teleoperators Workshop, Hyannis, Massachusetts (Nov. 9–11, 1987).

Lawless, W. and R. Arenz, "Miniature Solid–state Gas Compressor," *Rev. Sci Instrum.,* 58(8), pp. 1487–1493, Aug. 1987.

Nguyen, T., J. A. Willett and Kornbluh, R., "Robotic systems," in ONR Ocean, Atmosphere, and Space Fiscal Year 1998 Annual Reports (Dec. 1998).

Olsson, A., G. Stemme, and E. Stemme, "The First Valve––less Diffuser Gas Pump," Tenth Annual International Workshop on Micro Electromechanical Systems, Nagoya, Japan, *IEEE Proceedings* (Jan. 26–30, 1997), pp. 108–113.

R. Pelrine and Kornbluh, R., and. 1995. "Dexterous Multiarticulated Manipulator with Electrostrictive Polymer Artificial Muscle Actuator," EMU 95–023, SRI International, Menlo Park, California, Apr. 28, 1995.

Pelrine, R. and Kornbluh, "Electroactive Polymer Devices", U.S. patent application Ser. No. 09/619,848, filed Jul. 20, 2000, 67 pages.

Pelrine et al., "Electroactive Polymer Generators", U.S. patent application Ser. No. 09/619,848, filed Jul. 20, 2000, 69 pages.

Pelrine, R., R. Kornbluh, and J. Joseph, "Electrostriction of Polymer Dielectrics with Compliant Electrodes as a Means of Actuation," *Sensors and Actuators A: Physical,* vol. 64, 1998, pp. 77–85.

Pelrine, R., R. Kornbluh and J. Eckerle, "Monolithic Electroactive Polymers", U.S. patent application Ser. No. 09/779,203, filed Feb. 7, 2001, 47 pages.

Pelrine, R, R. Kornbluh, J. Joseph, and S. Chiba, "Electrostriction of Polymer Films for Microactuators," *Proc. IEEE Tenth Annual International Workshop on Micro Electro Mechanical Systems,* Nagoya, Japan, Jan. 26–30, 1997, pp. 238–243.

Pelrine, R., R. Kornbluh, and J. Eckerle. "Energy Efficient Electroactive Polymers and Electroactive Polymer Devices", U.S. patent application Ser. No. 09/779,373, filed Feb. 7, 2001.

Pelrine, R., and J. Joseph, *FY 1992 Final Report on Artificial Muscle for Small Robots,* ITAD–3393–FR–93–063, SRI International, Menlo Park, California, Mar. 1993.

Pelrine, R., R. Kornbluh, and J. Joseph, FY 1999 *Final Report on Artificial Muscle for Small Robots,* ITAD–10162–FR–00–27, SRI International, Menlo Park, California, 2000.

Pelrine, R., R. Kornbluh, Q. Pei, and J. Joseph, "High Speed Electrically Actuated Elastomers with Over 100% Strain," *Science,* vol. 287, No. 5454, pp. 1–21, 2000.

Pelrine, R., Roy Kornbluh, Jose Joseph, Qibing Pei, Seiki Chiba "Recent Progress in Artificial Muscle Micro Actuators,", SRI International, Tokyo, 1999 MITI/NEEDOIMNIC, 1999.

Smela, E., O. Inganäs, Q. Pei, and I. Lundström, "Electrochemical Muscles: Micromachining Fingers and Corkscrews,"*Advanced Materials,* vol. 5, No. 9, pp. 630–632, Sep. 1993.

Wax, S. G. and R. R. Sands, "Electroactive Polymer Actuators and Devices," Proceedings of the SPIE International Symposium on Smart Structures and Materials: Electro–Active Polymer Actuators and Devices, Mar. 1–2, 1999, Newport Beach, California, USA., pp. 2–10.

Winters, J., "Muscle as an Actuator for Intelligent Robots", Robotics Research:Trans. Robotics International of SME, Scottsdale, AZ (Aug. 21, 1986).

\* cited by examiner

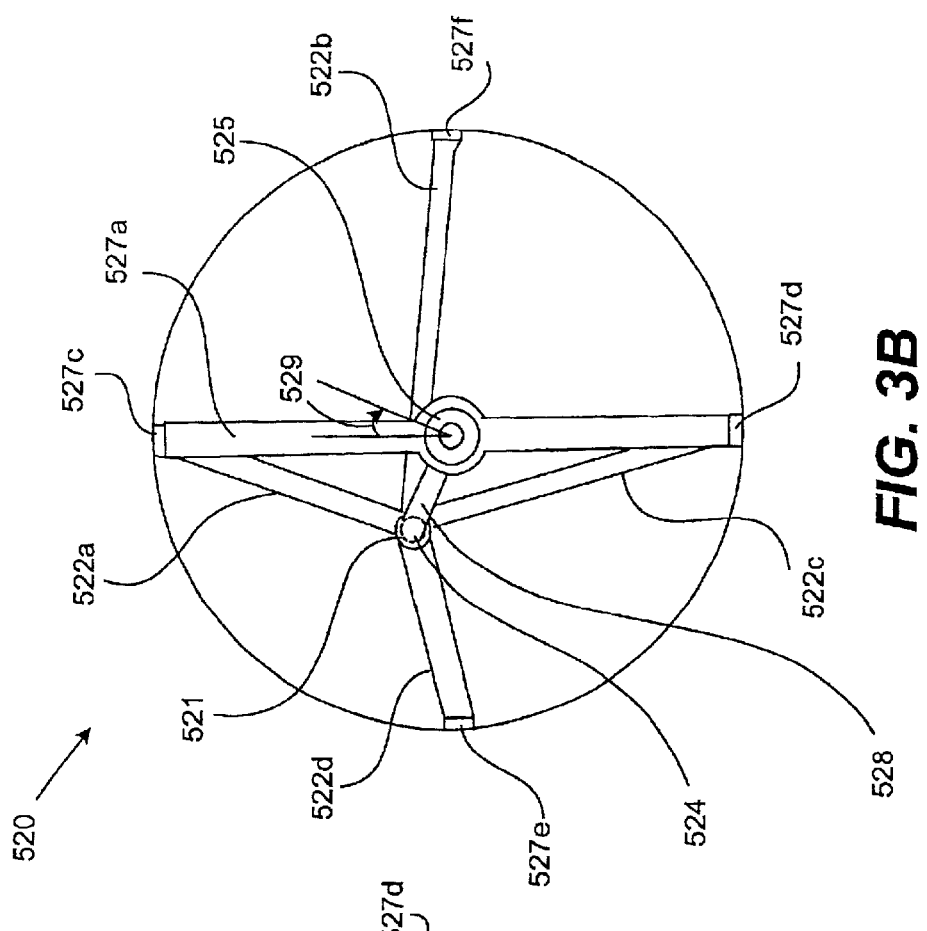
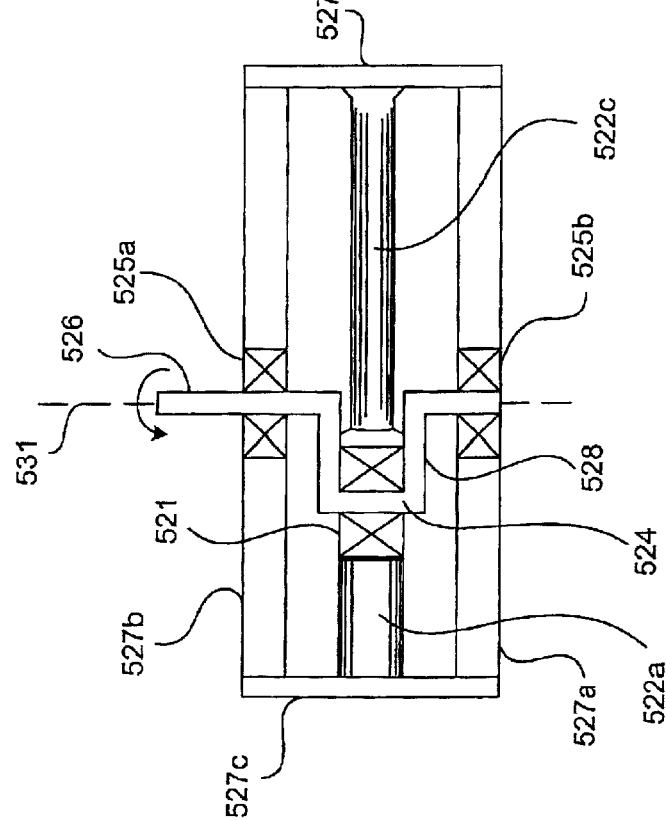
FIG. 3B
FIG. 3C

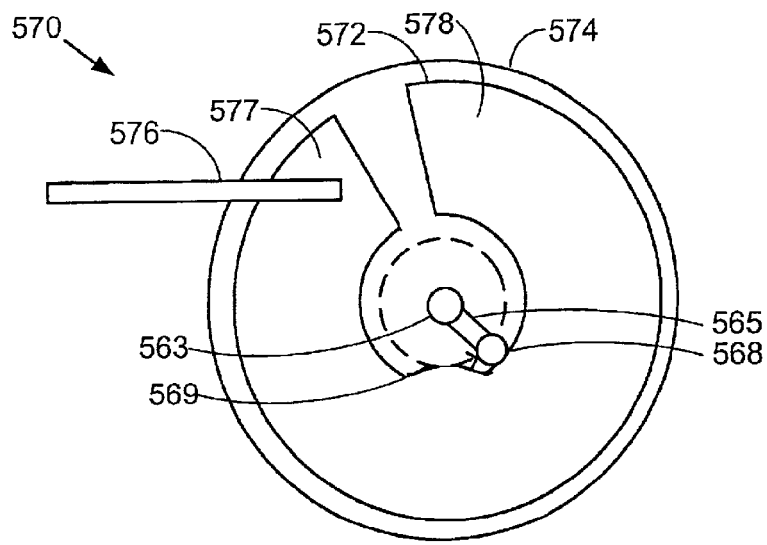
FIG. 3K
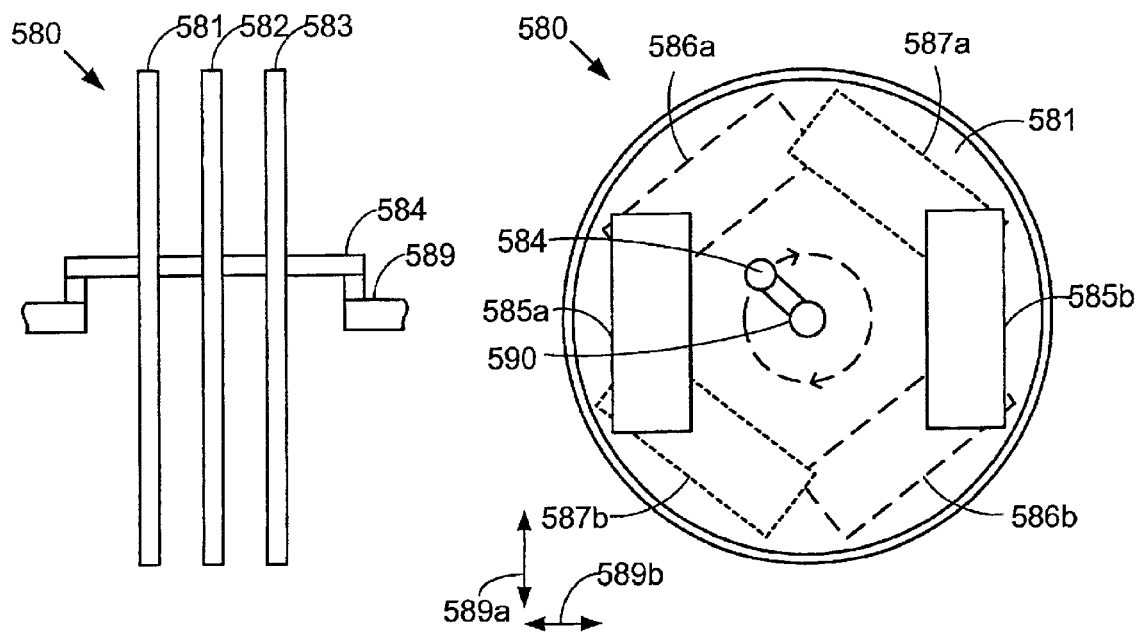
FIG. 3L
FIG. 3M

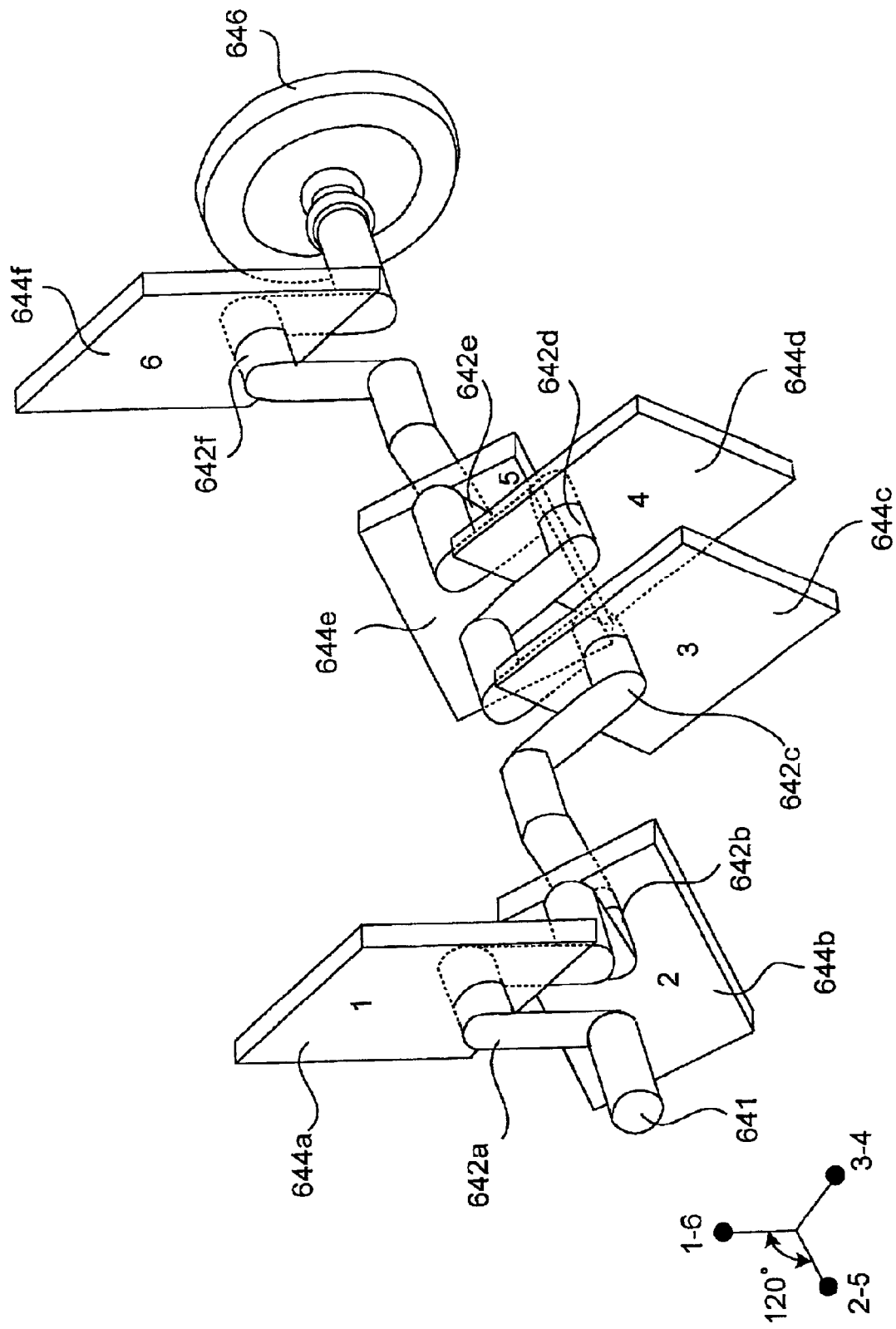

ELECTROACTIVE POLYMER ROTARY MOTORS

CROSS-REFERENCE TO RELATED APPLICATION

This application claims priority under 35 U.S.C. §119(e) from co-pending U.S. Provisional Patent Application No. 60/273,108, filed on Mar. 2, 2001 which is incorporated by reference for all purposes.

BACKGROUND OF THE INVENTION

The present invention relates generally to motors comprising one or more electroactive polymers. More particularly, the present invention relates to rotary motors and their use in various applications.

A motor converts from an input energy to mechanical energy. Most often, the mechanical energy is output as rotary motion of a shaft, but linear motors for translating a shaft are also commonly used. The most common class of input energy for a motor is electricity. Electric motors include AC, DC, servo, and stepper motors. Compressed air and pressurized hydraulic fluid are also used to power air and hydraulic motors. Gasoline or diesel engines are another traditional class of motors that rely on combustion of a fuel. Each of these motor classes has advantages and disadvantages that influence their usage.

For a DC motor, DC current is typically supplied from battery sources. Battery voltages are often in multiples of 1.5 volts, with 12 volts being common. DC motors are made in different electrical configurations, each of which provides a different torque-speed relationship that describes how the motor will respond to an applied load at different speeds. For a permanent magnet DC motor, torque often varies inversely with speed. Since the power available for a DC motor is typically limited, an increase in torque requires a decrease in velocity and vice versa. Thus, when a load is applied, the motor must reduce speed to compensate. One solution to the torque-speed problem is to use a 'speed-controlled DC motor', which contains a controller that increases and decreases current to the motor in the face of changing load to try and maintain a constant speed. These motors are typically expensive and may run from an AC source (in which case the controller converts from AC to DC).

AC motors provide continuous rotary motion but usually rely on current supplied by power companies. They are limited to a few speeds that are a function of the AC line frequency, e.g., 60 Hz in the U.S. The most common AC motor no-load speeds are 1725 and 3450 revolutions per minute (rpm), which represent some slippage from the more expensive synchronous AC motors speeds of 1800 and 3600 rpm. If other outputs speeds are desired, a gearbox speed reducer is attached to the motor's output shaft.

AC and DC motors are designed to provide continuous rotary output. Though they can be stalled against a load, many of them will not tolerate a full voltage, zero velocity stall for an extended period of time without overheating.

Servomotors are fast response motors using closed loop control capable of providing a programmed function of acceleration or velocity, or capable of holding a fixed position against a load. Thus, precise positioning of the output device is possible, as is control of the speed and shape of its time response to changes in load or input commands. However, these devices are very expensive and are commonly used in applications that justify their cost such as moving the flight control services of aircraft.

Stepper motors are designed to position an output device. Unlike servomotors, these are typically open loop, meaning they receive no feedback as to whether the output device has responded as requested. While being relatively good at holding the output in one position for indefinite period, they often are poor for high speed motion and may get out of phase with a desired control. In addition, these motors are moderately expensive, have a low torque capacity, and also require special controllers.

Most electromagnetic motors must consume electrical energy to maintain a force or torque. The only exceptions would be motors with preferred magnetic positions such as stepper motors that can resist a torque up to the torque that causes rotor slippage. But even stepper motors cannot provide a constant static torque at an arbitrary rotor position unless power is used. Thus, conventional electromagnetic motors typically use power even to hold a static torque where no external work is done. This is why at stall and low speed conditions the efficiency of almost all electromagnetic motors is poor.

Air and hydraulic motors have more limited application than electric motors since they require the availability of a compressed air or hydraulic source. Both these classes of motors provide poor energy efficiency due to the losses associated with the conversion of energy first from chemical or electrical energy to fluid pressure and then to mechanical output. Although individual air motors and air cylinders are relatively cheap, these pneumatic systems are quite expensive when the cost of all the ancillary equipment is considered.

In addition to the specific drawbacks discussed with respect to each class of motor, all of the above motors classes are generally heavy, bulky and not suitable for many applications such as those requiring light weight and/or continuous output. In view of the foregoing, improved systems that convert from an input energy to mechanical energy would be desirable.

SUMMARY OF THE INVENTION

In one aspect, the present invention relates to a new class of motors and electrical-mechanical power conversion systems. The systems comprise one or more electroactive polymers that convert between electrical and mechanical energy. When a voltage is applied to electrodes contacting an electroactive polymer, the polymer deflects. This deflection may be converted into rotation of a power output shaft included in a motor. Repeated deflection of the polymer may then produce continuous rotation of the power shaft.

Alternatively, when an electroactive polymer deflects with an existing charge on its surface, a change in electric field is produced in the polymer. This change in electric field may be used to produce electrical energy. Rotation of a power input shaft may be used to deflect the electroactive polymer. Continuous rotation of the power shaft may then be used to produce continuous electrical energy via the electroactive polymer.

In another aspect, the present invention relates to a mechanical-electrical power conversion system. The system comprises a power shaft configured to rotate about a fixed axis. The system also comprises a crank having a crank pin, a crank arm that transmits force between the crank pin and the power shaft, and a first transducer coupled to the crank pin. The transducer comprises a first active area, which includes at least a first portion of an electroactive polymer and at least two first active area electrodes coupled to the first portion of the electroactive polymer.

In yet another aspect, the present invention relates to a mechanical-electrical power conversion system. The system comprises a power shaft configured to rotate about an axis. The system also comprises a crank having a crank pin, a crank arm that transmits force between the crank pin and the power shaft, and a first transducer coupled to the crank pin. The transducer comprises a first active area, which includes at least a first portion of an electroactive polymer and at least two first active area electrodes coupled to the first portion of the electroactive polymer, wherein the electroactive polymer includes pre-strain.

In still another aspect, the present invention relates to a mechanical-electrical power conversion system. The system comprises a power shaft configured to rotate about a fixed axis. The system also comprises a crank having a crank pin, a crank arm that transmits force between the crank pin and the power shaft, and a first transducer coupled to the crank pin. The transducer comprises a first active area, which includes at least a first portion of an electroactive polymer and at least two first active area electrodes coupled to the first portion of the electroactive polymer. Elastic return of the electroactive polymer at least partially contributes to rotation of the power shaft.

In another aspect, the present invention relates to a mechanical-electrical power conversion system. The system comprises a power shaft configured to rotate about an axis. The system also comprises a crank having a crank pin, a crank arm that transmits force between the crank pin and the power shaft, and a first transducer coupled to the crank pin. The transducer comprises a first active area, which includes at least a first portion of an electroactive polymer and at least two first active area electrodes coupled to the first portion of the electroactive polymer. The power shaft includes a stall position that is maintained with substantially no electrical current to the first active area electrodes.

These and other features and advantages of the present invention will be described in the following description of the invention and associated figures.

BRIEF DESCRIPTION OF THE DRAWINGS

FIGS. 3B–C illustrate a rotary motor in accordance with another embodiment of the present invention.

FIG. 3K illustrates the deflection of a lower potion of the monolithic polymer included in the motor of FIG. 3I in accordance with another embodiment of the present invention.

FIGS. 3L–3M illustrate a side view and a front view, respectively, of a motor in accordance with another embodiment of the present invention.

FIG. 3N illustrates a top perspective view of an exemplary motor comprising a plurality of cranks arranged substantially equally about a crankshaft in accordance with a specific embodiment of the present invention.

DETAILED DESCRIPTION OF THE PREFERRED EMBODIMENTS

Figure 1A:
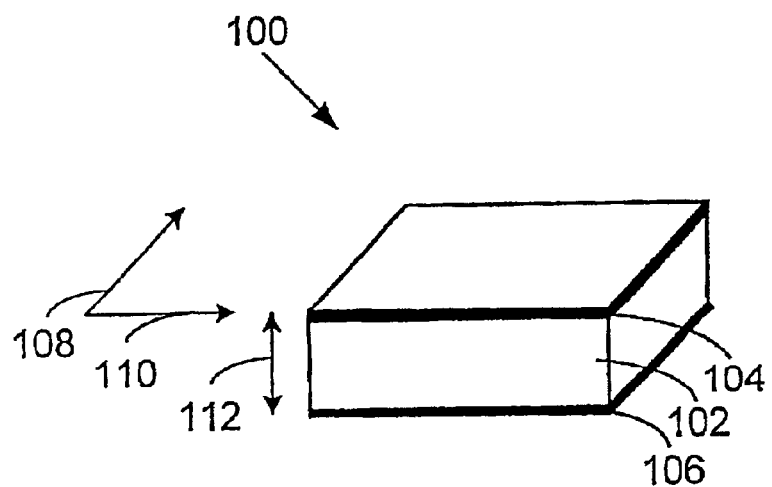
FIGS. 1A and 1B illustrate a top perspective view of a transducer before and after application of a voltage in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

1. Overview

In one aspect, the present invention relates to continuous output systems that include one or more electroactive polymer transducers. When actuated, a transducer of the present invention produces deflection in one or m ore directions. Repeated actuation of the transducer will produce reciprocating motion. Reciprocating motion of a transducer may be converted to continuous rotary motion of a power shaft included in a motor. A motor in accordance with the present invention comprises one or more transducers configured in a particular motor design. Combining different ways to configure and constrain a polymer within a motor, different ways to arrange active areas on a single or multiple polymers, different motor designs, scalability of electroactive polymers to both micro and macro levels, and different polymer orientations (e.g., rolling or stacking individual polymer layers) permits a broad range of motors that convert electrical energy into mechanical power. These motors will find use in a wide range of applications.

For ease of understanding, the present invention is mainly described and shown by focusing on a single direction of energy conversion. More specifically, the present invention focuses on converting electrical energy into mechanical energy. The mechanical energy is most often described herein as continuous rotary output power or rotary output for a number of polymer deflections. However, in all the figures and discussions for the present invention, it is important to note that the polymers and systems may convert between electrical energy and mechanical energy bi-directionally. Thus, any of the electroactive polymer systems and motor designs described herein can also convert mechanical energy to electrical energy (generator mode). Typically, a generator of the present invention comprises a polymer arranged in a manner that causes a change in electric field in response to deflection of a portion of the polymer. The change in electric field, along with changes in the polymer dimension in the direction of the field, produces a change in voltage, and hence a change in electrical energy.

For a transducer of the present invention, one mechanism for differentiating the behavior of the transducer, or a portion of the transducer associated with a single active area, as being an actuator or a generator is based on the change in net area (orthogonal to the thickness) associated with the polymer deflection. For these transducers or active areas, when the deflection causes the net area of the transducer/active area to decrease and there is charge on the electrodes, the transducer/active area is converting from mechanical to electrical energy and acting as a generator. Conversely, when the deflection causes the net area of the transducer/active area to increase and charge is on the electrodes; the transducer/active area is converting electrical to mechanical energy and acting as an actuator. The change in area in both cases corresponds to an inverse change in film thickness, i.e., the thickness contracts when the planar area expands, and the thickness expands when the planar area contracts. Both the change in area and change in thickness affect the amount of energy that is converted between electrical and mechanical. Since the effects due to a change in area and corresponding change in thickness are complementary, only the change in area will be discussed herein for sake of brevity. In addition, although deflection of an electroactive polymer will primarily be discussed as a net increase in area of the polymer when the polymer is being used in an actuator to produce mechanical energy, it is understood that in some cases (i.e. depending on the loading), the net area may decrease to produce mechanical work. Alternatively, when an electroactive polymer is continuously being cycled between actuator and generator modes, electrical or mechanical (elastic) energy may be stored from one part of the cycle for use in other parts of the cycle. This may further introduce situations in which the net area may decrease to produce mechanical work. Thus, devices of the present invention may include both actuator and generator modes, depending on how the polymer is arranged and applied.

2. General Structure of Electroactive Polymers

The transformation between electrical and mechanical energy in devices of the present invention is based on energy conversion of one or more active areas of an electroactive polymer. Electroactive polymers deflect when actuated by electrical energy. To help illustrate the performance of an electroactive polymer in converting electrical energy to mechanical energy, FIG. 1A illustrates a top perspective view of a transducer portion 100 in accordance with one embodiment of the present invention. The transducer portion 100 comprises an electroactive polymer 102 for converting between electrical energy and mechanical energy. In one embodiment, an electroactive polymer refers to a polymer that acts as an insulating dielectric between two electrodes and may deflect upon application of a voltage difference between the two electrodes. Top and bottom electrodes 104 and 106 are attached to the electroactive polymer 102 on its top and bottom surfaces, respectively, to provide a voltage difference across a portion of the polymer 102. Polymer 102 deflects with a change in electric field provided by the top and bottom electrodes 104 and 106. Deflection of the transducer portion 100 in response to a change in electric field provided by the electrodes 104 and 106 is referred to as actuation. As polymer 102 changes in size, the deflection may be used to produce mechanical work.

Figure 1B:
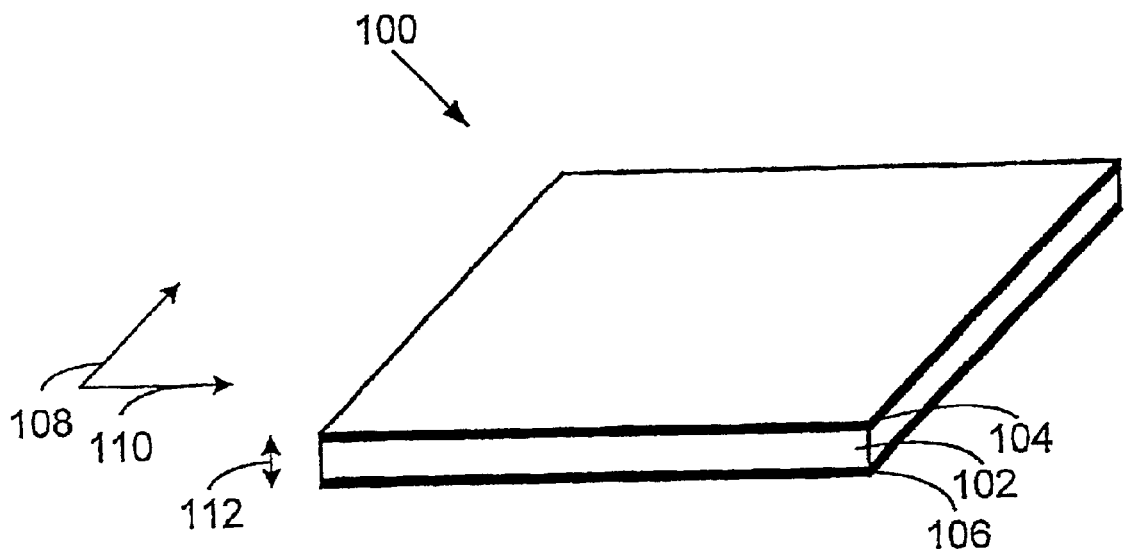

FIG. 1B illustrates a top perspective view of the transducer portion 100 including deflection in response to a change in electric field. In general, deflection refers to any displacement, expansion, contraction, torsion, linear or area strain, or any other deformation of a portion of the polymer 102. The change in electric field corresponding to the voltage difference applied to or by the electrodes 104 and 106 produces mechanical pressure within polymer 102. In this case, an applied voltage difference causes unlike electrical charges to accumulate on electrodes 104 and 106. Due to these charges, the electrodes attract each other and provide a compressive force between electrodes 104 and 106 and an expansion force on polymer 102 in planar directions 108 and 110, causing polymer 102 to be compressed between electrodes 104 and 106 and to stretch in the planar directions 108 and 110.

In some cases, electrodes 104 and 106 cover a limited portion of polymer 102 relative to the total area of the polymer. This may be done to prevent electrical breakdown around the edge of polymer 102 or to achieve customized deflections for one or more portions of the polymer. As the term is used herein, an active area is defined as a portion of a transducer comprising polymer material 102 and at least two electrodes. When the active area is used to convert electrical energy to mechanical energy, the active area includes a portion of polymer 102 having sufficient electrostatic force to enable deflection of the portion. When the active area is used to convert mechanical energy to electrical energy, the active area includes a portion of polymer 102 having sufficient deflection to enable a change in electrostatic energy. As will be described below, a polymer of the present invention may have multiple active areas. In some cases, polymer 102 material outside an active area may act as an external spring force on the active area during deflection. More specifically, polymer material outside the active area may resist active area deflection by its elastic contraction or expansion. Removal of the voltage difference and the induced charge causes the reverse effects.

Electrodes 104 and 106 are compliant and change shape with polymer 102. The configuration of polymer 102 and electrodes 104 and 106 provides for increasing polymer 102 response with deflection. More specifically, as the transducer portion 100 deflects, compression of polymer 102 brings the opposite charges of electrodes 104 and 106 closer and the stretching of polymer 102 separates similar charges in each electrode. In one embodiment, one of the electrodes 104 and 106 is ground.

In general, the transducer portion 100 continues to deflect until mechanical forces balance the electrostatic forces driving the deflection. The mechanical forces include elastic restoring forces of the polymer 102 material, the compliance of electrodes 104 and 106, and any external resistance provided by a device and/or load coupled to the transducer portion 100, etc. The deflection of the transducer portion 100 as a result of the applied voltage may also depend on a number of other factors such as the polymer 102 dielectric constant and the size of polymer 102.

Electroactive polymers in accordance with the present invention are capable of deflection in any direction. After application of the voltage between the electrodes 104 and 106, the electroactive polymer 102 increases in size in both planar directions 108 and 110. In some cases, the electroactive polymer 102 is incompressible, e.g. has a substantially constant volume under stress. In this case, the polymer 102 decreases in thickness as a result of the expansion in the planar directions 108 and 110. It should be noted that the present invention is not limited to incompressible polymers and deflection of the polymer 102 may not conform to such a simple relationship.

Application of a relatively large voltage difference between electrodes 104 and 106 on the transducer portion 100 shown in FIG. 1A will cause transducer portion 100 to change to a thinner, larger area shape as shown in FIG. 11B. In this manner, the transducer portion 100 converts electrical energy to mechanical energy. The transducer portion 100 may also be used to convert mechanical energy to electrical energy.

FIGS. 1A and 1B may be used to show one manner in which the transducer portion 100 converts mechanical energy to electrical energy. For example, if the transducer portion 100 is mechanically stretched by external forces to a thinner, larger area shape such as that shown in FIG. 1B, and a relatively small voltage difference (less than that necessary to actuate the film to the configuration in FIG. 1B) is applied between electrodes 104 and 106, the transducer portion 100 will contract in area between the electrodes to a shape such as in FIG. 1A when the external forces are removed. Stretching the transducer refers to deflecting the transducer from its original resting position—typically to result in a larger net area between the electrodes, e.g. in the plane defined by directions 108 and 110 between the electrodes. The resting position refers to the position of the transducer portion 100 having no external electrical or mechanical input and may comprise any pre-strain in the polymer. Once the transducer portion 100 is stretched, the relatively small voltage difference is provided such that the resulting electrostatic forces are insufficient to balance the elastic restoring forces of the stretch. When the external forces are removed, the transducer portion 100 therefore contracts, and it becomes thicker and has a smaller planar area in the plane defined by directions 108 and 110 (orthogonal to the thickness between electrodes). When polymer 102 becomes thicker, it separates electrodes 104 and 106 and their corresponding unlike charges, thus raising the electrical energy and voltage of the charge. Further, when electrodes 104 and 106 contract to a smaller area, like charges within each electrode compress, also raising the electrical energy and voltage of the charge. Thus, with different charges on electrodes 104 and 106, contraction from a shape such as that shown in FIG. 1B to one such as that shown in FIG. 1A raises the electrical energy of the charge. That is, mechanical deflection is being turned into electrical energy and the transducer portion 100 is acting as a generator.

In some cases, the transducer portion 100 may be described electrically as a variable capacitor. The capacitance decreases for the shape change going from that shown in FIG. 1B to that shown in FIG. 1A. Typically, the voltage difference between electrodes 104 and 106 will be raised by contraction. This is normally the case, for example, if additional charge is not added or subtracted from electrodes 104 and 106 during the contraction process. The increase in electrical energy, U, may be illustrated by the formula $U=0.5\ Q^2/C$, where Q is the amount of positive charge on the positive electrode and C is the variable capacitance which relates to the intrinsic dielectric properties of polymer 102 and its geometry. If Q is fixed and C decreases, then the electrical energy U increases. The increase in electrical energy and voltage can be recovered or used in a suitable device or electronic circuit in electrical communication with electrodes 104 and 106. In addition, the transducer portion 100 may be mechanically coupled to a mechanical input that deflects the polymer and provides mechanical energy.

The transducer portion 100 will convert mechanical energy to electrical energy when it contracts. Some or all of the charge and energy can be removed when the transducer portion 100 is fully contracted in the plane defined by directions 108 and 110. Alternatively, some or all of the charge and energy can be removed during contraction. If the electric field pressure in the polymer increases and reaches balance with the mechanical elastic restoring forces and external load during contraction, the contraction will stop before full contraction, and no further elastic mechanical energy will be converted to electrical energy. Removing some of the charge and stored electrical energy reduces the electrical field pressure, thereby allowing contraction to continue. Thus, removing some of the charge may further convert mechanical energy to electrical energy. The exact electrical behavior of the transducer portion 100 when operating as a generator depends on any electrical and mechanical loading as well as the intrinsic properties of polymer 102 and electrodes 104 and 106.

In one embodiment, electroactive polymer 102 is pre-strained. Pre-strain of a polymer may be described, in one or more directions, as the change in dimension in a direction after pre-straining relative to the dimension in that direction before pre-straining. The pre-strain may comprise elastic deformation of polymer 102 and be formed, for example, by stretching the polymer in tension and fixing one or more of the edges while stretched. For many polymers, pre-strain improves conversion between electrical and mechanical energy. The improved mechanical response enables greater mechanical work for an electroactive polymer, e.g., larger deflections and actuation pressures. In one embodiment, prestrain improves the dielectric strength of the polymer. In another embodiment, the pre-strain is elastic. After actuation, an elastically pre-strained polymer could, in principle, be unfixed and return to its original state. The pre-strain may be imposed at the boundaries using a rigid frame or may also be implemented locally for a portion of the polymer.

In one embodiment, pre-strain is applied uniformly over a portion of polymer 102 to produce an isotropic pre-strained polymer. For example, an acrylic elastomeric polymer may be stretched by 200 to 400 percent in both planar directions. In another embodiment, pre-strain is applied unequally in different directions for a portion of polymer 102 to produce an anisotropic pre-strained polymer. In this case, polymer 102 may deflect greater in one direction than another when actuated. While not wishing to be bound by theory, it is believed that pre-straining a polymer in one direction may increase the stiffness of the polymer in the pre-strain direction. Correspondingly, the polymer is relatively stiffer in the high pre-strain direction and more compliant in the low pre-strain direction and, upon actuation, more deflection occurs in the low pre-strain direction. In one embodiment, the deflection in direction 108 of transducer portion 100 can be enhanced by exploiting large prestrain in the perpendicular direction 110. For example, an acrylic elastomeric polymer used as the transducer portion 100 maybe stretched by 100 percent in direction 108 and by 500 percent in the perpendicular direction 110. The quantity of pre-strain for a polymer may be based on the polymer material and the desired performance of the polymer in an application. Pre-strain suitable for use with the present invention is further described in copending U.S. patent application Ser. No. 09/619,848, which is incorporated by reference for all purposes.

Generally, after the polymer is pre-strained, it may be fixed to one or more objects. Each object is preferably suitably stiff to maintain the level of pre-strain desired in the polymer. The polymer may be fixed to the one or more objects according to any conventional method known in the art such as a chemical adhesive, an adhesive layer or material, mechanical attachment, etc.

Anisotropic prestrain may also improve the performance of a transducer to convert mechanical to electrical energy in a generator mode. In addition to increasing the dielectric breakdown strength of the polymer and allowing more charge to be placed on the polymer, high pre-strain may improve mechanical to electrical coupling in the low pre-strain direction. That is, more of the mechanical input into the low pre-strain direction can be converted to electrical output, thus raising the efficiency of the generator.

The quantity of pre-sirain for a polymer may be based on the electroactive polymer and the desired performance of the polymer in an actuator or application. For some polymers of the present invention, pre-strain in one or more directions may range from −100 percent to 600 percent. By way of example, for a VHB acrylic elastomer having isotropic pre-strain, pre-strains of at least about 100 percent, and preferably between about 200–400 percent, may be used in each direction. In one embodiment, the polymer is pre-strained by a factor in the range of about 1.5 times to 50 times the original area. For an anisotropic acrylic pre-strained to enhance actuation in a compliant direction, pre-strains between about 400–500 percent may be used in the stiffened direction and pre-strains between about 20–200 percent may be used in the compliant direction. In some cases, pre-strain may be added in one direction such that a negative pre-strain occurs in another direction, e.g. 600 percent in one direction.

Transducers and pre-strained polymers of the present invention are not limited to any particular geometry or type of deflection. For example, the polymer and electrodes may be formed into any geometry or shape including tubes and rolls, stretched polymers attached between multiple rigid structures, stretched polymers attached across a frame of any geometry—including curved or complex geometries, across a frame having one or more joints, etc. Deflection of a transducer according to the present invention includes linear expansion and compression in one or more directions, bending, axial deflection when the polymer is rolled, deflection out of a hole provided on a substrate, etc. Deflection of a transducer may be affected by how the polymer is constrained by a frame or rigid structures attached to the polymer. In one embodiment, a flexible material that is stiffer in elongation than the polymer is attached to one side of a transducer to induce bending when the polymer is actuated.

Materials suitable for use as a pre-strained polymer with the present invention may include any substantially insulating polymer or rubber (or combination thereof) that deforms in response to an electrostatic force or whose deformation results in a change in electric field. One suitable material is NuSil CF19-2186 as provided by NuSil Technology of Carpenteria, Calif. Other exemplary materials suitable for use as a pre-strained polymer include silicone elastomers, acrylic elastomers such as VHB 4910 acrylic elastomer as produced by 3 M Corporation of St. Paul, Minn., polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example. Combinations of some of these materials may also be used as the electroactive polymer in transducers of this invention.

An electroactive polymer layer in transducers of the present invention may have a wide range of thicknesses. In one embodiment, polymer thickness may range between about 1 micrometer and 2 millimeters. Polymer thickness may be reduced by stretching the film in one or both planar directions. In many cases, electroactive polymers of the present invention may be fabricated and implemented as thin films. Thicknesses suitable for these thin films may be below 50 micrometers.

Although the discussion so far has focused primarily on one type of electroactive polymer commonly referred to as dielectric elastomers (transducer 100 of FIG. 1A), motors of the present invention may also incorporate other conventional electroactive polymers. As the term is used herein, an electroactive polymer refers to a polymer that responds to electrical stimulation. Other common classes of electroactive polymer suitable for use with many embodiments of the present invention include electrostrictive polymers, electronic electroactive polymers, and ionic electroactive polymers, and some copolymers. Electrostrictive polymers are characterized by the non-linear reaction of a electroactive polymers (relating strain to $E^2$). Electronic electroactive polymers typically change shape or dimensions due to migration of electrons in response to electric field. Ionic electroactive polymers are polymers that change shape or dimensions due to migration of ions in response to electric field (the polymers contains an aqueous electrolyte). Irradiated copolymer of polyvinylidene difluoride and trifluoroethelene P(VDF-TrFE) is an electroactive polymer suitable for use with some embodiments of the present invention.

Suitable actuation voltages for electroactive polymers, or portions thereof, may vary based on the material properties of the electroactive polymer, such as the dielectric constant, as well as the dimensions of the polymer, such as the thickness of the polymer film. For example, actuation electric fields used to actuate polymer 102 in FIG. 1A may range in magnitude from about 0 V/m to about 440 MV/m. Actuation electric fields in this range may produce a pressure in the range of about 0 Pa to about 10 MPa. In order for the transducer to produce greater forces, the thickness of the polymer layer may be increased. Actuation voltages for a particular polymer may be reduced by increasing the dielectric constant, decreasing the polymer thickness, and decreasing the modulus of elasticity, for example.

As electroactive polymers of the present invention may deflect at high strains, electrodes attached to the polymers should also deflect without compromising mechanical or electrical performance. Generally, electrodes suitable for use with the present invention may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present invention may include compliant electrodes that conform to the shape of an electroactive polymer to which they are attached. The electrodes may be only applied to a portion of an electroactive polymer and define an active area according to their geometry. Several examples of electrodes that only cover a portion of an electroactive polymer will be described in further detail below.

Various types of electrodes suitable for use with the present invention are described in copending U.S. patent application Ser. No. 09/619,848, which was previously incorporated by reference above. Electrodes described therein and suitable for use with the present invention include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present invention may vary. Suitable materials used in an electrode may include graphite, carbon black, colloidal suspensions, thin metals including silver and gold, silver filled and carbon filled gels and polymers, and ionically or electrically conductive polymers. In a specific embodiment, an electrode suitable for use with the present invention comprises 80 percent carbon grease and 20 percent carbon black in a silicone rubber binder such as Stockwell RTV60-CON as produced by Stockwell Rubber Co. Inc. of Philadelphia, Pa. The carbon grease is of the type such as NyoGel 756G as provided by Nye Lubricant Inc. of Fairhaven, Mass. The conductive grease may also be mixed with an elastomer, such as silicon elastomer RTV 118 as produced by General Electric of Waterford, N.Y., to provide a gel-like conductive grease.

It is understood that certain electrode materials may work well with particular polymers and may not work as well for others. For example, carbon fibrils work well with acrylic elastomer polymers while not as well with silicone polymers. For most transducers, desirable properties for the compliant electrode may include one or more of the following: low modulus of elasticity, low mechanical damping, low surface resistivity, uniform resistivity, chemical and environmental stability, chemical compatibility with the electroactive polymer, good adherence to the electroactive polymer, and the ability to form smooth surfaces. In some cases, a transducer of the present invention may implement two different types of electrodes, e.g. a different electrode type for each active area or different electrode types on opposing sides of a polymer.

Electronic drivers are typically connected to the electrodes. The voltage provided to electroactive polymer will depend upon specifics of an application. In one embodiment, a transducer of the present invention is driven electrically by modulating an applied voltage about a DC bias voltage. Modulation about a bias voltage allows for improved sensitivity and linearity of the transducer to the applied voltage. For example, a transducer used in an audio application may be driven by a signal of up to 200 to 1000 volts peak to peak on top of a bias voltage ranging from about 750 to 2000 volts DC.

3. Multiple Active Areas

In accordance with the present invention, the term "monolithic" is used herein to refer to electroactive polymers, transducers, and devices comprising a plurality of active areas.

Figure 1C:
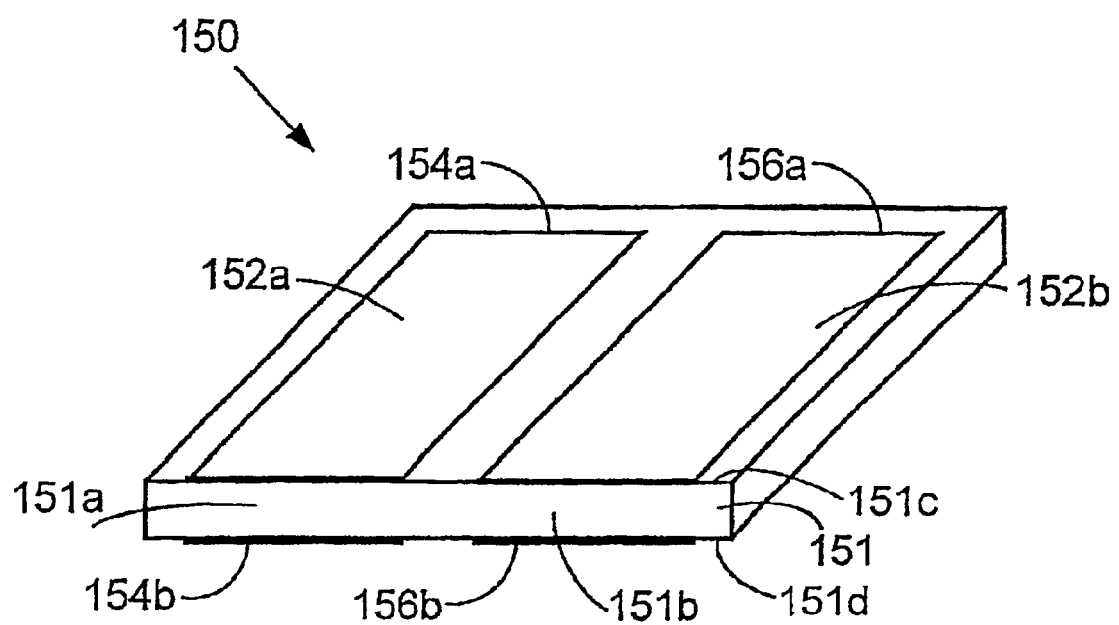
FIG. 1C illustrates a monolithic transducer comprising a plurality of active areas in accordance with one embodiment of the present invention.

FIG. 1C illustrates a monolithic transducer 150 comprising a plurality of active areas in accordance with one embodiment of the present invention. The monolithic transducer 150 converts between electrical energy and mechanical energy. The monolithic transducer 150 comprises an electroactive polymer 151 including two active areas 152$a$ and 152$b$. The polymer 151 can be held using, for example, a rigid frame (not shown) attached at the edges of the polymer 151.

The active area 152$a$ has top and bottom electrodes 154$a$ and 154$b$ attached to the polymer 151 on its top and bottom surfaces 151$c$ and 151$d$, respectively. The electrodes 154$a$ and 154$b$ provide a voltage difference across a portion 151$a$ of the polymer 151. The portion 151$a$ deflects with a change in electric field provided by the electrodes 154$a$ and 154$b$. The portion 151$a$ comprises the polymer 151 between the electrodes 154$a$ and 154$b$ and any other portions of the polymer 151 having sufficient electrostatic force to enable deflection upon application of voltages using the electrodes 154$a$ and 154$b$. When the device 150 is used as a generator to convert from electrical energy to mechanical energy, deflection of the portion 151 a causes a change in electric field in the portion 151 a that is received as a change in voltage difference by the electrodes 154$a$ and 154$b$.

The active area 152$b$ has top and bottom electrodes 156$a$ and 156$b$ attached to the polymer 151 on its top and bottom surfaces 151$c$ and 151$d$, respectively. The electrodes 156$a$ and 156$b$ provide a voltage difference across a portion 151$b$ of the polymer 151. The portion 151$b$ deflects with a change in electric field provided by the electrodes 156$a$ and 156$b$. The portion 151$b$ comprises the polymer 151 between the electrodes 156$a$ and 156$b$ and any other portions of the polymer 151 having sufficient stress induced by the electrostatic force to enable deflection upon application of voltages using the electrodes 156$a$ and 156$b$. When the device 150 is used as a generator to convert from electrical energy to mechanical energy, deflection of the portion 151$b$ causes a change in electric field in the portion 151$b$ that is received as a change in voltage difference by the electrodes 156$a$ and 156$b$.

The active areas for monolithic polymers and transducers of the present invention may be flexibly arranged. In one embodiment, active areas in a polymer are arranged such that elasticity of the active areas is balanced. In another embodiment, a transducer of the present invention includes a plurality of symmetrically arranged active areas. Further description of monolithic transducers suitable for use with the present invention are further described in commonly owned U.S. patent application Ser. No. 09/779,203, which is incorporated by reference herein for all purposes.

4. Actuator Designs

The deflection of an electroactive polymer can be used in a variety of ways to produce or receive mechanical energy. One common implementation of a transducer in a motor is within an actuator. Several exemplary actuators suitable for use with motors of the present invention will now be discussed.

Expansion in one direction of an electroactive polymer may induce contractile stresses in a second direction such as due to Poisson effects. This may reduce the mechanical output for a transducer that provides mechanical output in the second direction. Correspondingly, actuators used in motors of the present invention may be designed to constrain a polymer in the non-output direction. In some cases, actuators may be designed to improve mechanical output using deflection in the non-output direction.

Figure 2A:
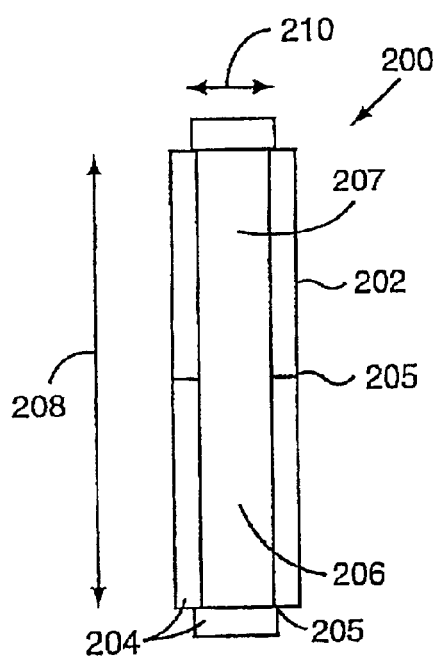
FIGS. 2A–2C illustrate a linear actuator suitable for use with motors of the present invention.
Figure 2B:
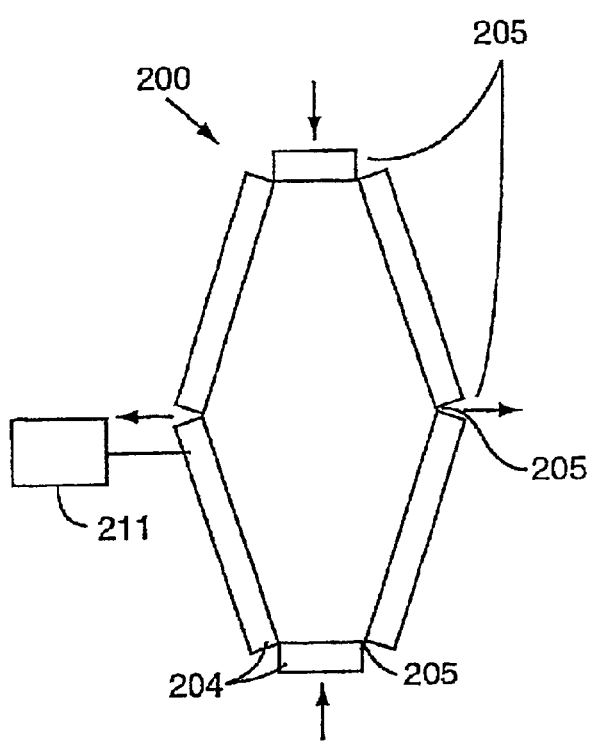

An actuator that uses deflection in one planar direction to improve energy conversion in the other planar direction is a bow actuator. FIGS. 2A and 2B illustrate a bow actuator 200 suitable for use with motors of the present invention. The bow actuator 200 is a planar mechanism comprising a flexible frame 202 which provides mechanical assistance to improve conversion from electrical energy to mechanical energy for a polymer 206 attached to the frame 202. The frame 202 includes six rigid members 204 connected at joints 205. The members 204 and joints 205 provide mechanical assistance by coupling polymer deflection in a planar direction 208 into mechanical output in a perpendicular planar direction 210. More specifically, the frame 202 is arranged such that a small deflection of the polymer 206 in the direction 208 improves displacement in the perpendicular planar direction 210. Attached to opposing (top and bottom) surfaces of the polymer 206 are electrodes 207 (bottom electrode on bottom side of polymer 206 not shown) to provide a voltage difference across a portion of the polymer 206.

The polymer 206 is configured with different levels of pre-strain in its orthogonal directions. More specifically, electroactive polymer 206 includes a high pre-strain in the planar direction 208, and little or no pre-strain in the perpendicular planar direction 210. This anisotropic pre-strain is arranged relative to the geometry of the frame 202. More specifically, upon actuation using electrodes 207, the polymer contracts in the high pre-strained direction 208. With the restricted motion of the frame 202 and the lever arm provided by the members 204, this contraction helps drive deflection in the perpendicular planar direction 210. Thus, even for a short deflection of the polymer 206 in the high pre-strain direction 208, the frame 202 bows outward in the direction 210. In this manner, a small contraction in the high pre-strain direction 210 becomes a larger expansion in the relatively low pre-strain direction 208.

Using the anisotropic pre-strain and constraint provided by the frame 202, the bow actuator 200 allows contraction in one direction to enhance mechanical deflection and electrical to mechanical conversion in another. In other words, a load 211 (FIG. 2B) attached to the bow actuator 200 is coupled to deflection of the polymer 206 in two directions—direction 208 and 210. Thus, as a result of the differential pre-strain of the polymer 206 and the geometry of the frame 202, the bow actuator 200 is able to provide a larger mechanical displacement and mechanical energy output than an electroactive polymer alone for common electrical input.

The pre-strain in the polymer 206 and constraint provided by the frame 202 may also allow the bow actuator 200 to use lower actuation voltages for the pre-strained polymer 206 for a given deflection. As the bow actuator 200 has a lower effective modulus of elasticity in the low pre-strained direction 210, the mechanical constraint provided by the frame 202 allows the bow actuator 200 to be actuated in the direction 210 to a larger deflection with a lower voltage. In addition, the high pre-strain in the direction 208 increases the breakdown strength of the polymer 206, permitting higher voltages and higher deflections for the bow actuator 200.

Figure 2C:
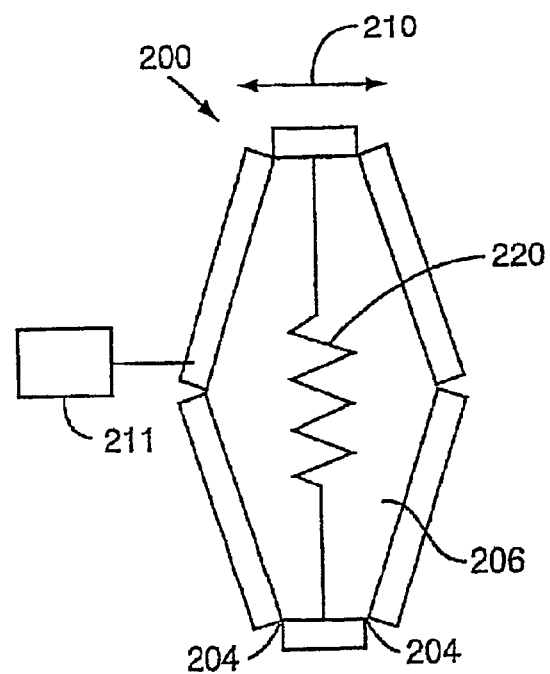

In one embodiment, the bow actuator 200 may include additional components to provide mechanical assistance and enhance deflection. By way of example, springs 220 as shown in FIG. 2C may be attached to the bow actuator 200 to enhance deflection in the direction 210. The springs load the bow actuator 200 such that the spring force exerted by the springs 220 opposes resistance provided by an external load. In some cases, the springs 220 provide increasing assistance for bow actuator 200 deflection. In addition, pre-strain may be increased to enhance deflection. The load may also be coupled to the rigid members 204 on top and bottom of the frame 202 rather than on the rigid members of the side of the frame 202 (as shown in FIG. 2B).

The shape and constraint of an electroactive polymer may affect deflection. An aspect ratio for an electroactive polymer is defined as the ratio of its length to width. If the aspect ratio is high (e.g., an aspect ratio of at least about 4:1) and the polymer is constrained along its length by rigid members, than the combination may result in a substantially one-dimensional deflection in the width direction.

Figure 2D:
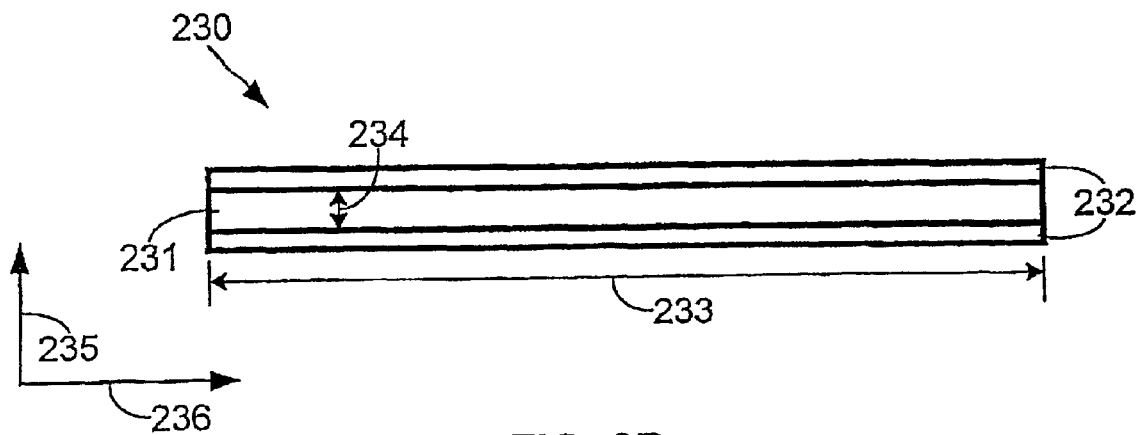
FIGS. 2D and 2E illustrate a linear actuator suitable for use with motors of the present invention.
Figure 2E:

FIGS. 2D and 2E illustrate a linear motion actuator 230 suitable for use with motors of the present invention. Linear motion actuator 230 is a planar mechanism having mechanical deflection in one direction. Linear motion actuator 230 comprises a polymer 231 having a length 233 substantially greater than its width 234 (e.g., an aspect ratio at least about 4:1). Polymer 231 is attached on opposite sides to stiff members 232 of a frame along its length 233. Stiff members 232 have a greater stiffness than the polymer 231. The geometric edge constraint provided by stiff members 232 substantially prevents displacement in a direction 236 along the polymer length 233 and facilitates deflection almost exclusively in a direction 235. When the linear motion actuator 230 is implemented with a polymer 231 having anisotropic pre-strain, such as a higher pre-strain in the direction 236 than in the direction 235, then the polymer 231 is stiffer in the direction 236 than in the direction 235 and large deflections in the direction 235 may result.

A collection of electroactive polymers or actuators may be mechanically linked to form a larger actuator with a common output, e.g. force and/or displacement. By using a small electroactive polymer as a base unit in a collection, conversion of electric energy to mechanical energy may be scaled according to an application. By way of example, multiple linear motion actuators 230 may be combined in series in the direction 235 to form an actuator having a cumulative deflection of all the linear motion actuators in the series.

Figure 2F:
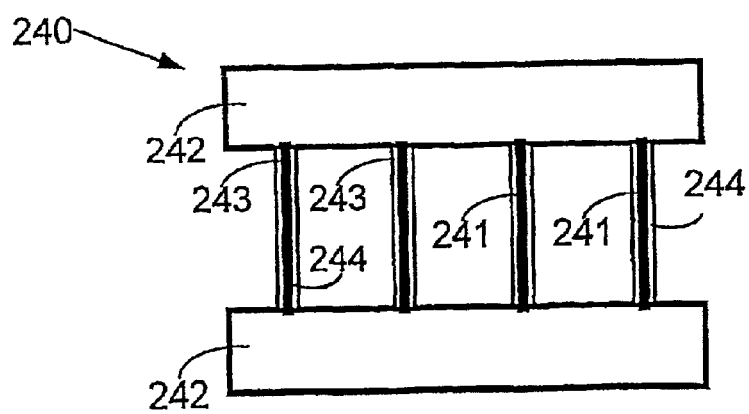
FIG. 2F illustrates cross-sectional side view of a multi-layer actuator for converting from electrical energy to mechanical energy.

FIG. 2F illustrates cross-sectional side view of a multi-layer actuator 240 for converting from electrical energy to mechanical energy. The multilayer actuator 240 includes four pre-strained polymers 241 arranged in parallel and each attached to a rigid frame 242 such that they have the same deflection. Electrodes 243 and 244 are deposited on opposite surfaces of each polymer 241 and provide simultaneous electrostatic actuation to the four pre-strained polymers 241. The multilayer actuator 240 provides cumulative force output of the individual polymer layers 241.

An electroactive polymer is typically compliant and does not provide a large stiffness, e.g., relative to a solid structure. Many mechanical applications require an electroactive polymer actuator having stiffness in all directions but the direction of actuation. Rigid members may be included in a device and provide stiffness in one or more directions. However, these stiff members may constrain deflection of the polymer and are typically not used in the direction of output motion.

Figure 2G:
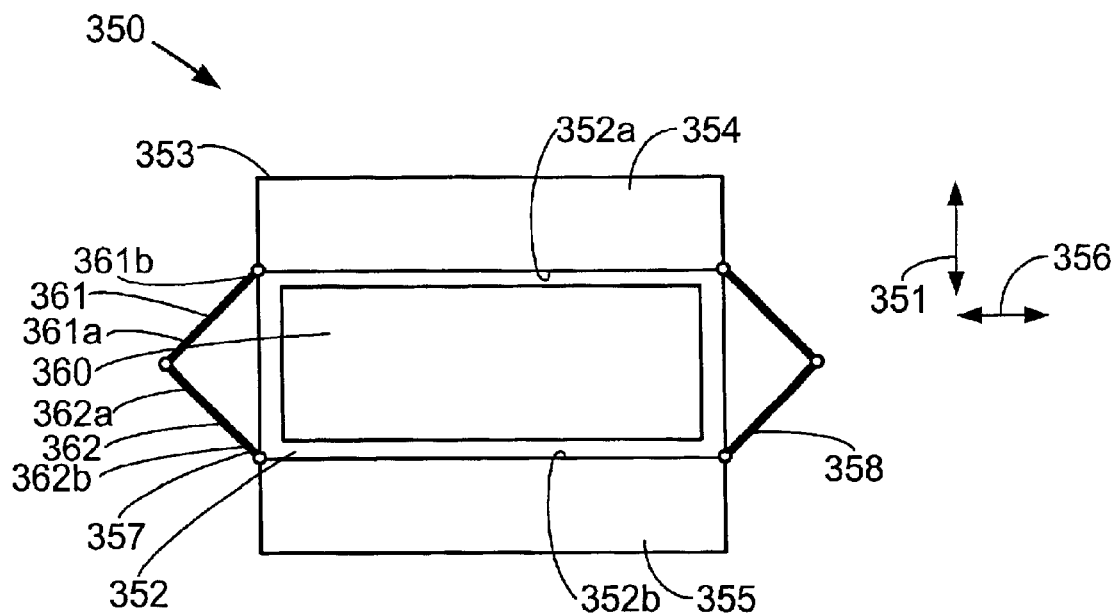
FIGS. 2G–2H illustrate a linear motion device in accordance with one embodiment of the present invention.

FIG. 2G illustrates a linear motion device 350 in accordance with one embodiment of the present invention. The device 350 is a planar mechanism having mechanical deflection in one direction 351. The device 350 comprises an electroactive polymer 352 arranged in a manner which causes a portion of the polymer to deflect in response to a change in electric field. Electrodes 360*a* and 360*b* are attached to opposite surfaces (only the foremost electrode 360*a* is shown) of the polymer 352 and cover a substantial portion of the polymer 352. The polymer 352 is attached to a frame 353. The frame 353 provides mechanical support and stiffness for the device 350 in all directions, linear and torsional, except a direction of output motion 351. The frame 353 includes stiff members 354 and 355 each connected to distal ends of flexures 357 and 358.

The stiff members 354 and 355 are attached along opposite edges 352a and 352b, respectively, of the polymer 352. The stiff members 354 and 355 have a greater stiffness than the polymer 352. The added stiffness and geometric constraint provided by the stiff members 354 and 355 substantially prevents displacement in a direction 356 along the polymer length. Using only the stiff members, compliance for the device 350 remains in the direction 351 and any torsional deflection about the polymer 352.

Figure 2H:
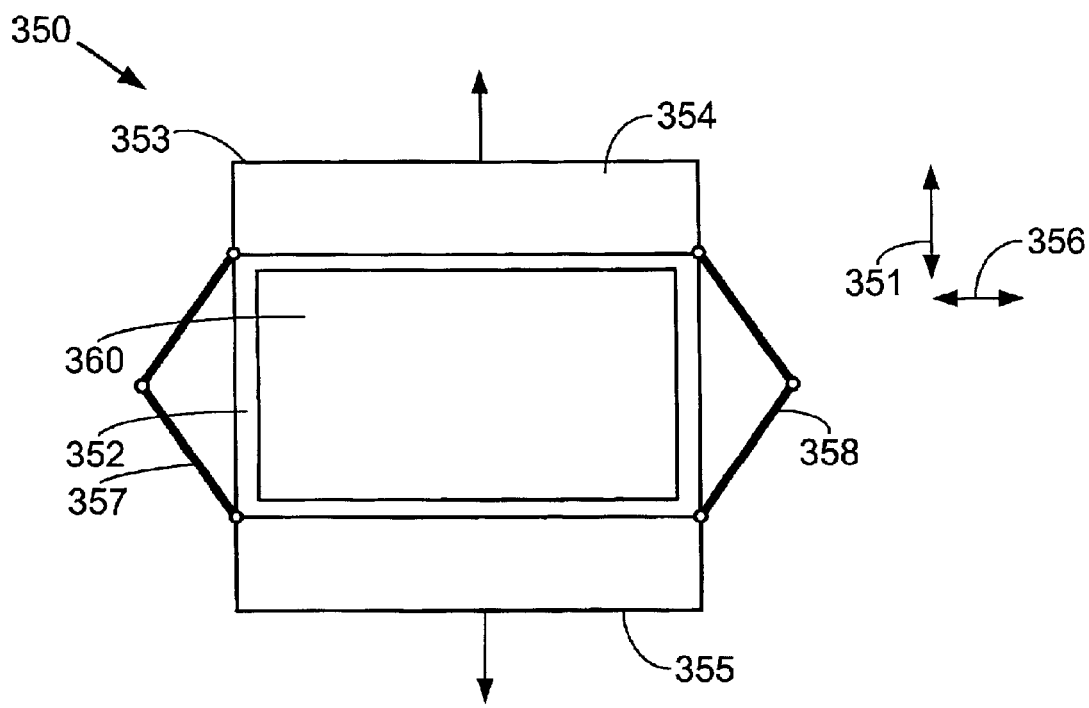

Upon actuation of the polymer 352, expansion of the polymer 352 in the direction 351 causes edges 352a and 352b and the stiff members 354 and 355 to move apart, as shown in FIG. 2H. In addition, expansion of the polymer 352 in the direction 351 causes the torsional supports 357 and 358 to straighten. Thus, deflection of the device 350 is almost exclusively in the direction 351.

Flexures 357 and 358 provide torsional stiffness for the device 350. Without flexures 357 and 358, the stiff members 354 and 355 may twist out of the plane of the polymer 352. In one embodiment, each flexure 357 and 358 is a two-bar linkage. For example, the flexure 357 comprises first and second members 361 and 362 hingeably coupled to each other at their proximate ends 361a and 362a, respectively. The first and second members 361 and 362 are also hingeably coupled to the stiff members 354 and 355 at their distal ends 361b and 362b, respectively. The first and second members 361 and 362 prevent torsion about the axis 351 but allow deflection of the device linearly in the direction 359b.

One advantage of the device 350 is that the entire structure is planar. This allows for easy mechanical coupling and simple expansion to produce multiple polymer designs. By way of example, the stiff members 354 and 355 may be mechanically coupled (e.g. glued or similarly fixed) to their respective counterparts of a second device 350 to provide two devices 350 in parallel in order to increase the force output over a single device 350. Similarly, the stiff member 354 from one device may be attached to the stiff member 355 from a second device in order to provide multiple actuators in series that increase the deflection output over a single device 350.

The constraint and shape of an electroactive polymer may affect deflection. In one embodiment, the polymer 352 has a length (along the dimension 359b) substantially greater than its width (along the dimension 359a). In a specific embodiment, the polymer has an aspect ratio at least about 4:1. In another embodiment, the device 350 is implemented with a polymer 352 having anisotropic pre-strain. For example, the polymer may include a higher pre-strain in the direction 359a than the direction 359b. As a result, the polymer 352 is stiffer in the direction 359a than the direction 359b and larger deflections in the direction 359b may result during actuation when voltage is applied to the electrodes 360.

In another embodiment, electroactive polymers suitable for use with motors of the present invention may be rolled or folded into linear transducers and actuators that deflect axially while converting from electrical energy to mechanical energy. As fabrication of electroactive polymers is often simplest with fewer numbers of layers, rolled actuators provide an efficient manner of squeezing large layers of polymer into a compact shape. Rolled or folded transducers and actuators typically include two or more layers of polymer. Rolled or folded actuators are applicable wherever linear actuators are used, such as robotic legs and fingers, high force grippers, or any of the motor designs described below.

Figure 2I:
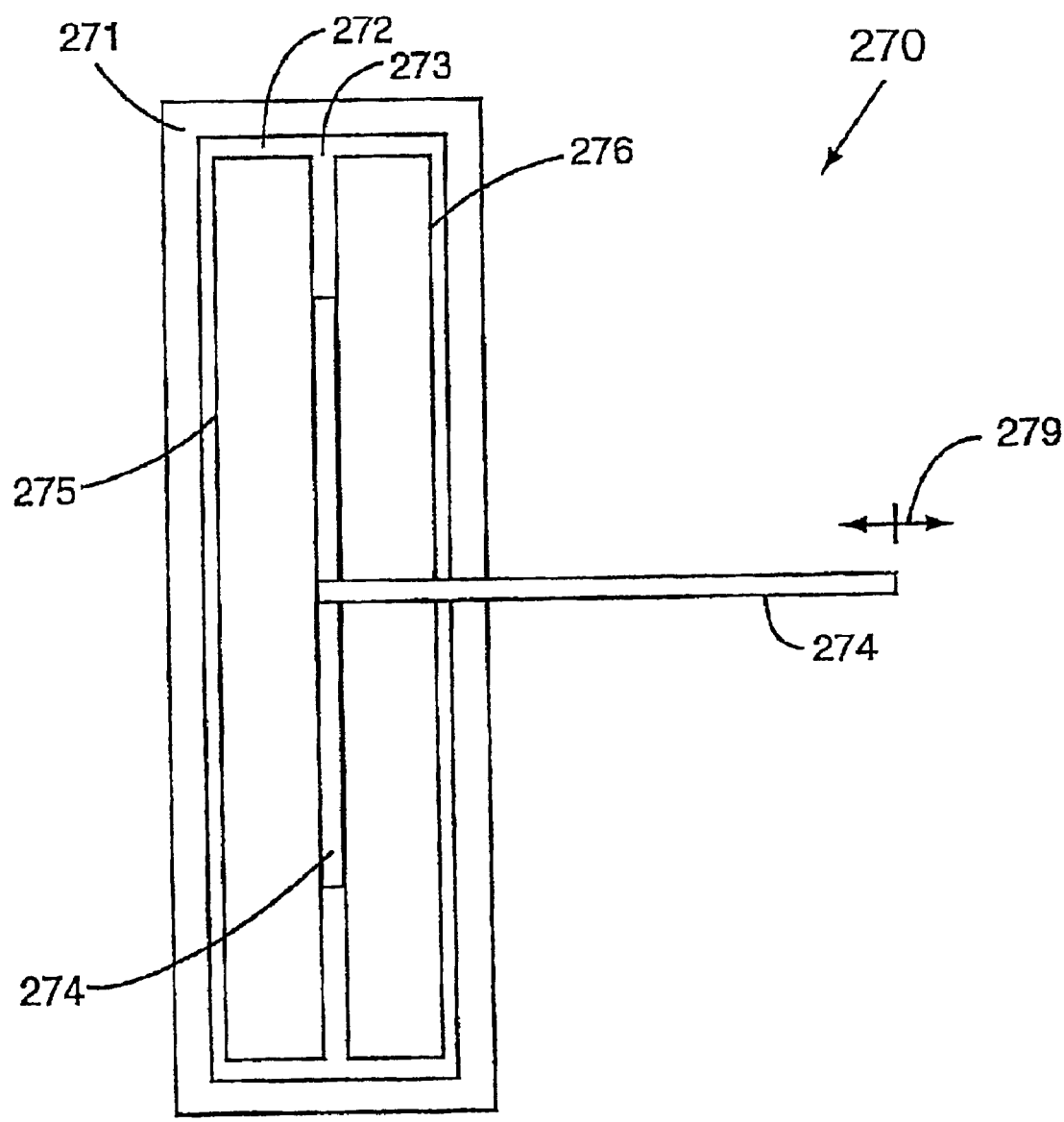
FIG. 2I illustrates a stretched film actuator suitable for use with motors of the present invention.

FIG. 2I illustrates a stretched film actuator 270 suitable for use with motors of the present invention. The stretched film actuator 270 includes a rigid frame 271 having a hole 272. An electroactive polymer 273 is attached in tension to the frame 271 and spans the hole 272. A rigid bar 274 is attached to the center of the polymer 273 and provides external displacement corresponding to deflection of the polymer 273. Compliant electrode pairs 275 and 276 are patterned on both top and bottom surfaces of the polymer 273 on the left and right sides respectively of the rigid bar 274.

When the electrode pair 275 is actuated, a portion of the polymer 273 between and in the vicinity of the top and bottom electrode pair 275 expands relative to the rest of the polymer 273 and the existing tension in the remainder of the polymer 273 pulls the rigid bar 274 to move to the right. Conversely, when the electrode pair 276 is actuated, a second portion of the polymer 273 affected by the electrode pair 276 expands relative to the rest of the polymer 273 and allows the rigid bar 274 to move to the left. Alternating actuation of the electrodes 275 and 276 provides a total stroke 279 for the rigid bar 274. One variation of this actuator includes adding anisotropic pre-strain to the polymer such that the polymer has high pre-strain (and stiffness) in the direction perpendicular to the rigid bar displacement. Another variation is to eliminate one of the electrode pairs. For the benefit of simplifying the design, this variation reduces the stroke 279 for the stretched film actuator 270. In this case, the portion of the polymer no longer used by the removed electrode now responds passively like a restoring spring.

Figure 2J:
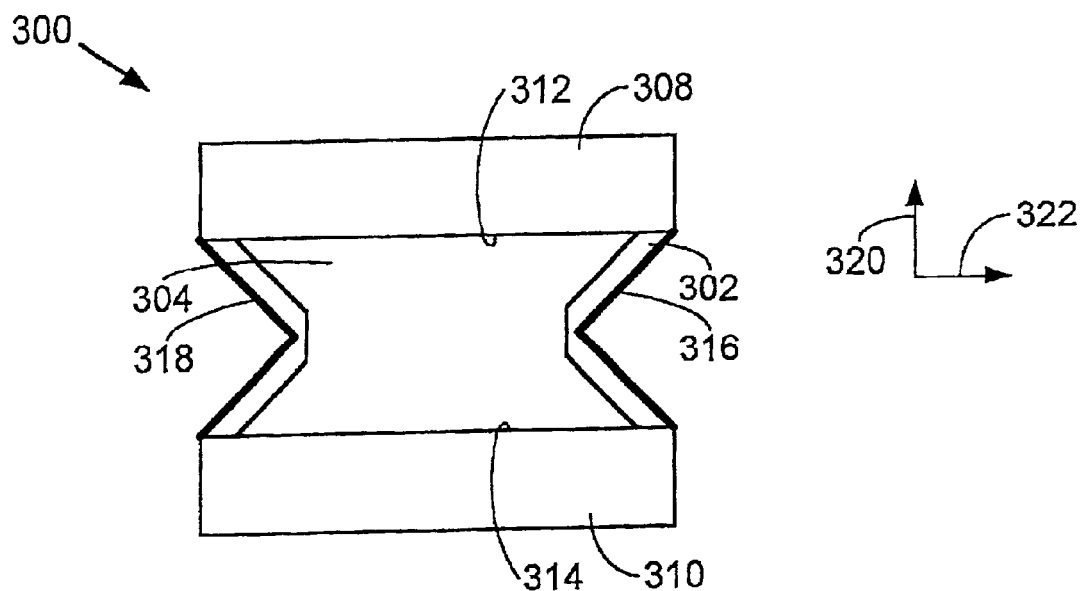
FIGS. 2J and 2K illustrate a linear actuator suitable for use with motors of the present invention.
Figure 2K:
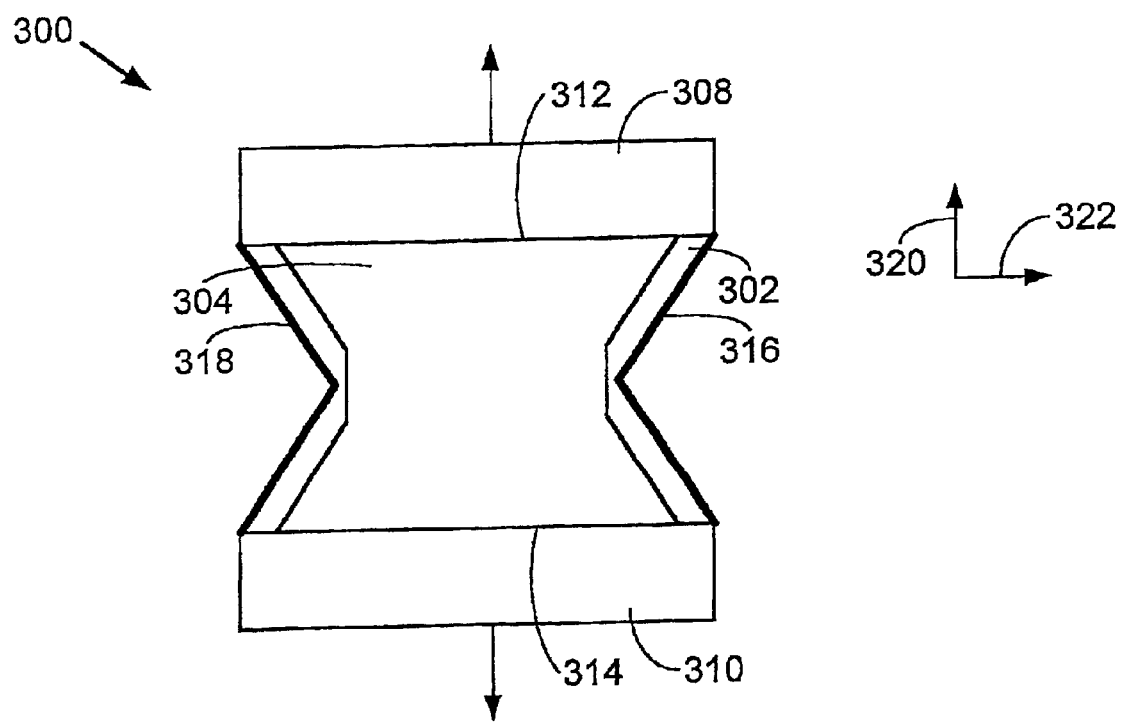

FIGS. 2J and 2K illustrate an actuator 300 suitable for use in motors of the present invention. The actuator 300 includes a polymer 302 arranged in a manner which causes a portion of the polymer to deflect in response to a change in electric field. Electrodes 304 are attached to opposite surfaces (only the foremost electrode is shown) of the polymer 302 and cover a substantial portion of the polymer 302. Two stiff members 308 and 310 extend along opposite edges 312 and 314 of the polymer 302. Flexures 316 and 318 are situated along the remaining edges of the polymer 302. The flexures 316 and 318 improve conversion from electrical energy to mechanical energy for the actuator 300.

The flexures 316 and 318 couple polymer 302 deflection in one direction into deflection in another direction. In one embodiment, each of the flexures 316 and 318 rest at an angle about 45 degrees in the plane of the polymer 302. Upon actuation of the polymer 302, expansion of the polymer 302 in the direction 320 causes the stiff members 308 and 310 to move apart, as shown in FIG. 2O. In addition, expansion of the polymer 302 in the direction 322 causes the flexures 316 and 318 to straighten, and further separates the stiff members 308 and 310. In this manner, the actuator 300 couples expansion of the polymer 302 in both planar directions 320 and 322 into mechanical output in the direction 320.

The polymer 302 is configured with different levels of pre-strain in orthogonal directions 320 and 322. This anisotropic pre-strain is arranged relative to the geometry of the flexures 316 and 318. More specifically, the polymer 302 includes a higher pre-strain in the direction 320, and little or no pre-strain in the perpendicular planar direction 322.

Although FIGS. 2A–2K illustrate several actuators suitable for use with motors of the present invention, other actuators including one or more electroactive polymers may also be used. Other exemplary actuators include bending beam actuators, diaphragm actuators and inchworm actuators are also suitable for use with the present invention. Additional exemplary linear and non-linear actuators suitable for use with the present invention are described in commonly owned U.S. patent application application Ser. No. 09/619,848, which was previously incorporated by reference.

5. Motor Designs

In general, a motor in accordance with the present invention comprises one or more electroactive polymers configured in a particular motor design. The design converts repeated deflection of an electroactive polymer into continuous rotation of a power shaft included in a motor. There are an abundant number of motor designs suitable for use with the present invention—including conventional motor designs retrofitted with one or more electroactive polymers and custom motor designs specially designed for electroactive polymer usage. Several motor designs suitable for use with the present invention will now be discussed. These exemplary rotary motor designs convert deflection of one or more electroactive polymers into output rotary motion for a rotary motor or linear motion for a linear motor. Although the exemplary mechanical-electrical power conversion systems described below are primarily described with respect to converting electrical to mechanical energy, it is understood that any of these systems may be used in the reverse direction, that is, in converting mechanical power to electrical power.

Figure 3A:
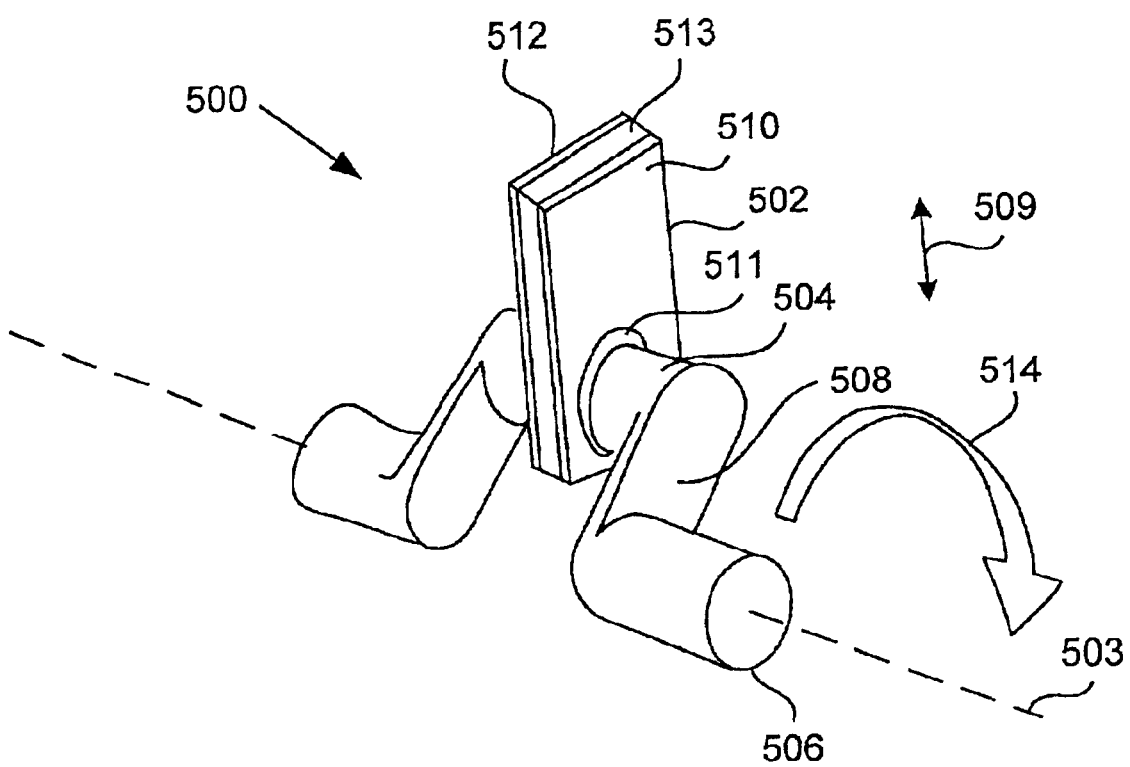
FIG. 3A illustrates a perspective view of a simplified rotary motor in accordance with one embodiment of the present invention.

FIG. 3A illustrates a perspective view of a simplified rotary motor 500 in accordance with one embodiment of the present invention. Motor 500 converts electrical power to mechanical power. As shown in FIG. 3A, rotary crank motor 500 comprises four elements: a transducer 502, a crank pin 504, a power shaft 506, and a crank arm 508.

As the term is used herein, a crank refers to the part of a rotary motor that provides power to the power shaft 506. For motor 500, the crank comprises transducer 502, crank pin 504, and crank arm 508. Transducer 502 includes two electrodes 510 and 512 attached on opposing surfaces of an electroactive polymer 513. Using electrical energy provided by the electrodes 510 and 512, transducer 502 is capable of translational deflection in a direction 509. Crank pin 504 provides coupling between transducer 502 and crank arm 508. Crank arm 508 transmits force between the crank pin 504 and the power shaft 506. Power shaft 506 is configured to rotate about an axis 503. In this case, rotational direction 514 is defined as clockwise rotation about axis 503.

A bearing 511 facilitates coupling between transducer 502 and crank pin 504. Bearing 511 is attached on its inner surface to the crank pin 504 and attached on its outer surface to transducer 502. Bearing 511 allows substantially lossless relative motion between transducer 502 and crank pin 504.

Actuation of transducer 502 moves crank pin 504 down and causes power shaft 506 to rotate. More specifically, as illustrated in FIG. 3A, actuation of transducer 502 pushes bearing 511 downward. As bearing 511 translates downward in direction 509, crank pin 504 rotates about power shaft 506 in clockwise direction 514. Actuation of transducer 502 may be referred to as the 'power stroke' for the motor 500. As deflection of transducer 502 continues, crank pin 504 follows an orbital path around power shaft 506 as defined by the geometry of crank arm 508.

In a specific embodiment, crank pin 504 reaches its furthest downward displacement in direction 509 (bottom dead center) as actuation for transducer 502 finishes. Momentum of crank pin 504 and crank arm 508 continue to move crank pin 504 in direction 514 around power shaft 506 at bottom dead center. Upon removal of electric energy from the transducer 502, elastic return in the polymer 513 causes the lower portion of the transducer 502 to deflect upwards. Elastic return of the polymer 502, and momentum of crank pin 504 and crank arm 508, continue to move crank pin 504 upwards in direction 514 around power shaft 506. When the crank pin 504 passes its minimal downward displacement in the direction 509 (top dead center), actuation of transducer 502 begins. Actuation and elastic return in this manner may be repeatedly performed to produce continuous rotation of the power shaft 506 about axis 503.

For motor 500, movement of transducer 502 from top dead center to bottom dead center is called a downstroke, and movement of the transducer 502 from bottom dead center to top dead center is called an upstroke. As illustrated, transducer 502 actuates during the downstroke and uses elastic return of the polymer 513 during the upstroke to make one complete revolution of the power shaft 506. In this case, actuation and elastic return of the electroactive polymer 513 contribute to separate portions of the rotation of power shaft 506.

In one embodiment, a connecting rod is connected on one end to polymer 513 and on the opposite end to crank pin 504 to facilitate cooperation between transducer 502 and crank pin 504. In this case, the top end of the connecting rod is connected to transducer 502 and translates up-and-down in direction 509. The opposite end of the connecting rod is coupled to crank pin 504 and rotates around power shaft 506 with crank pin 504. Upon actuation of transducer 502, the upper end of the connecting rod moves downward with the transducer 502 in direction 509. The opposite end of the connecting rod moves down and in a circular motion as defined by crank arm 508, which rotates about crankshaft 506.

The transducer 502 may be included in an actuator. In one embodiment, one of the linear actuators described above, e.g., the actuator 300 of FIGS. 2J and 2K or the linear motion actuator of FIGS. 2D and 2E, is coupled to crank pin 504 and provides reciprocating translational motion in the direction 509. Rigid member 310 of actuator 300 may then be rotably coupled to crank pin 504, e.g., via a bearing or connecting rod.

As shown in FIG. 3A, power shaft 506, crank arm 508, and crank pin 504 are a single continuous structure, also referred to as a crankshaft. A crankshaft is a shaft with an offset portion—a crank pin and a crank arm—that describes a circular path as the crankshaft rotates. In another embodiment, the power shaft 506, the crank arm 508, and the crank pin 504 are separate structures. For example, crank arm 508 may be a rigid member rotatably coupled to the crank pin 504 at one end and attached to the power shaft 506 at another end, e.g., similar to a bicycle pedal crank.

The exemplary motor shown in FIG. 3A has been simplified in order to not unnecessarily obscure the present invention. As one of skill in the art will appreciate, other structures and features may be present to facilitate or improve operation. For example, a portion of transducer 502, such as an end or edge of polymer 574, may be grounded, attached to a fixed element, or otherwise fixed relative to power shaft 506 rotation. In addition, transducer 502 may be significantly larger than as shown to reduce the amount of transducer strain needed to rotate the crank pin 504. As shown, transducer 502 may rely on several hundred percent strain to fully rotate the crank, which is allowable according to some transducers of the present invention. However, a transducer 502 having a larger planar area, say 10 to 20 times larger than the planar area shown in FIG. 3A, may be used to reduce the amount of transducer strain needed in the polymer to rotate the crank pin 504. For example, the size of transducer 502 may be selected to produce a strain of about 20 percent to about 100 percent strain in the polymer to rotate crank pin 504. Further, insulation or other preventative measures may be taken to prevent electrical energy loss from the electrodes. In some cases, current may arc across the outer unprotected boundary between electrodes 512 and 510. To prevent such undesired electrical energy movement, electrodes 512 and 510 may be recessed from the polymer 513 boundary. Alternatively, insulation may be disposed at the transducer 502 periphery. Some of the actuators described above also include rigid members and structures that may be used to prevent electrical energy loss.

Using a single transducer as described with respect to the motor 500 may result in uneven power distribution during rotation of power shaft 506. Full reliable rotation of the shaft may also require substantial rotational inertia and speed to prevent the shaft from merely rotating in an oscillatory fashion (i.e. less than 360 degrees rotation). In one embodiment, a rotary motor of the present invention comprises multiple transducers that provide power to rotate a power shaft. The multiple transducers may also be configured to reduce dead spots in rotation of the power shaft, e.g., by offsetting the transducers at different angles, thus producing a more consistent and continuous flow of output power for the motor.

In one embodiment, multiple transducers are coupled to a single crank pin. FIGS. 3B–C illustrate diagrammatic front and side views, respectively, of a rotary motor 520 in accordance with another embodiment of the present invention. Rotary motor 520 converts electrical power to mechanical power. As shown in FIGS. 3B–C, rotary crank motor 520 comprises four transducers 522a–d coupled to a single crank pin 524.

The crank for the motor 520 comprises the four transducers 522a–d, the crank pin 524, and a crank arm 528. Crank pin 524 provides coupling between transducers 522a–d and crank arm 528. Bearing 521 facilitates rotational coupling between transducers 522a–d and crank pin 524. Bearing 521 is attached on its inner surface to the crank pin 524 and attached on its outer surface to the transducers 522a–d. Bearing 521 allows substantially lossless motion between the transducers 522a–d and crank pin 524.

Power shaft 526 is configured to rotate about axis 531, defined by center bearings 525a and 525b. Center bearings 525 constrain the power shaft 526 in all degrees of freedom except rotation about the axis 531. Center bearings 525 are attached to a housing 527. Housing 527 includes parallel walls 527a and 527b that provide support for center bearings 525. Housing 527 also includes perpendicular walls 527c–f that provide stationary support for the distal ends of transducers 522a–d. Crank arm 528 transmits force between crank pin 524 and power shaft 526. Power shaft 526, crank arm 528, and crank pin 524 are a single continuous piece and made of any suitable material that transmits power produced from the transducers 522a–d into rotation for power shaft 526. In one embodiment, the material is a suitable metal such as steel or aluminum and is machined smooth to provide bearing surfaces for bearings and connecting rods, if used.

Transducers 522a–d each include electrodes that provide a voltage difference to an electroactive polymer included in each transducer. Using electrical energy provided by its corresponding electrodes, each transducer 522a–d is capable of independent deflection in a different direction. As illustrated in FIG. 3A, actuation of the transducer 522a moves the crank pin 524 down. Actuation of the transducer 522b moves the crank pin 524 to the left. Actuation of the transducer 522c moves the crank pin 524 up. Actuation of the transducer 522d moves the crank pin 524 to the right. When electrical energy is removed from the transducer 522a, elastic energy stored in the polymer included in transducer 522a pulls the crank pin 524 up. A similar elastic return occurs for the polymers included in the transducers 522b–d.

Transducers 522a–d are actuated sequentially to move the crank pin 524 in a circular path about axis 531. An angle theta 529 will be used to describe rotation of power shaft 526 about axis 531. Theta 529 is 0 degrees when the crank arm 526 is vertical. To achieve clockwise rotation of the power shaft 526 (as illustrated), the transducers 522a–d are actuated sequentially as follows. To start motion of the crank arm 526 from a resting position when theta 529 is 0 degrees, electrical energy is supplied to the transducer 522d and removed from the transducer 522b to move the crank pin 524 to the right. When the crank arm 526 passes an angle theta of 0 degrees, electrical energy is supplied to transducer 522a and removed from the transducer 522c. When the crank arm 526 passes an angle theta of 90 degrees, electrical energy is supplied to transducer 522b and removed from transducer 522d while electrical energy is still being supplied to transducer 522a. Thus, transducers 522a and 522b are actuated together for an angle theta between 90 and 180 degrees. When the crank pin 524 passes an angle theta of 180 degrees, electrical energy is supplied to transducers 522b and 522c and removed from transducer 522a. When the crank arm 526 passes an angle theta of 270 degrees, electrical energy is supplied to transducers 522c and 522d and removed from transducer 522b. This sequential actuation may be repeatedly performed to continuously rotate power shaft 526.

Transducers 522a–d are capable of rotating power shaft 526 in both rotational directions about axis 531. To achieve counter-clockwise rotation of the power shaft 526 (as illustrated), the transducers 522a–d are actuated sequentially as follows. To start motion of the crank arm 526 from a resting position when theta 529 is 0 degrees, electrical energy is supplied to the transducer 522b and removed from the transducer 522d to move the crank pin 524 to the left. When the crank arm 526 passes an angle theta 529 of 0 degrees, electrical energy is supplied to transducer 522a and removed from the transducer 522c. For an angle theta between 0 and 270 degrees, crank arm 526 is powered by actuation of transducers 522a and 522b, and assisted by elastic return of transducer 522c. For an angle theta 529 between 270 and 180 degrees, crank arm 526 is powered by actuation of transducers 522a and 522d, and assisted by elastic return of transducer 522b. For an angle theta 529 between 180 and 90 degrees, crank arm 526 is powered by actuation of transducers 522c and 522d, and assisted by elastic return of transducer 522a. Finally, for an angle theta 529 between 90 and 0 degrees, crank arm 526 is powered by actuation of transducers 522c and 522b, and assisted by elastic return of transducer 522d.

It should be noted that elastic energy stored in each polymer may contribute to rotation of power shaft 526. For example, while transducers 522*a* and 522*b* are actuated together for an angle theta between 90 and 180 degrees, elastic recoil of transducer 522*a* pulls crank pin 524 upwards. A similar elastic return occurs for each transducer as crank pin 524 rotates towards it from a stretched position. Further, as will be described in further detail below, total elastic potential energy for the motor 520 is substantially constant as the crank pin 524 rotates about axis 531.

As mentioned before, a connecting rod may be connected on one end of a transducer and on the opposite end to the crank pin to facilitate cooperation between transducer and crank pin. For multiple transducers coupled to a single crank pin, multiple connecting rods may be used. Alternatively, a single disk may be used to couple each of the transducers to the crank pin.

Figure 3D:
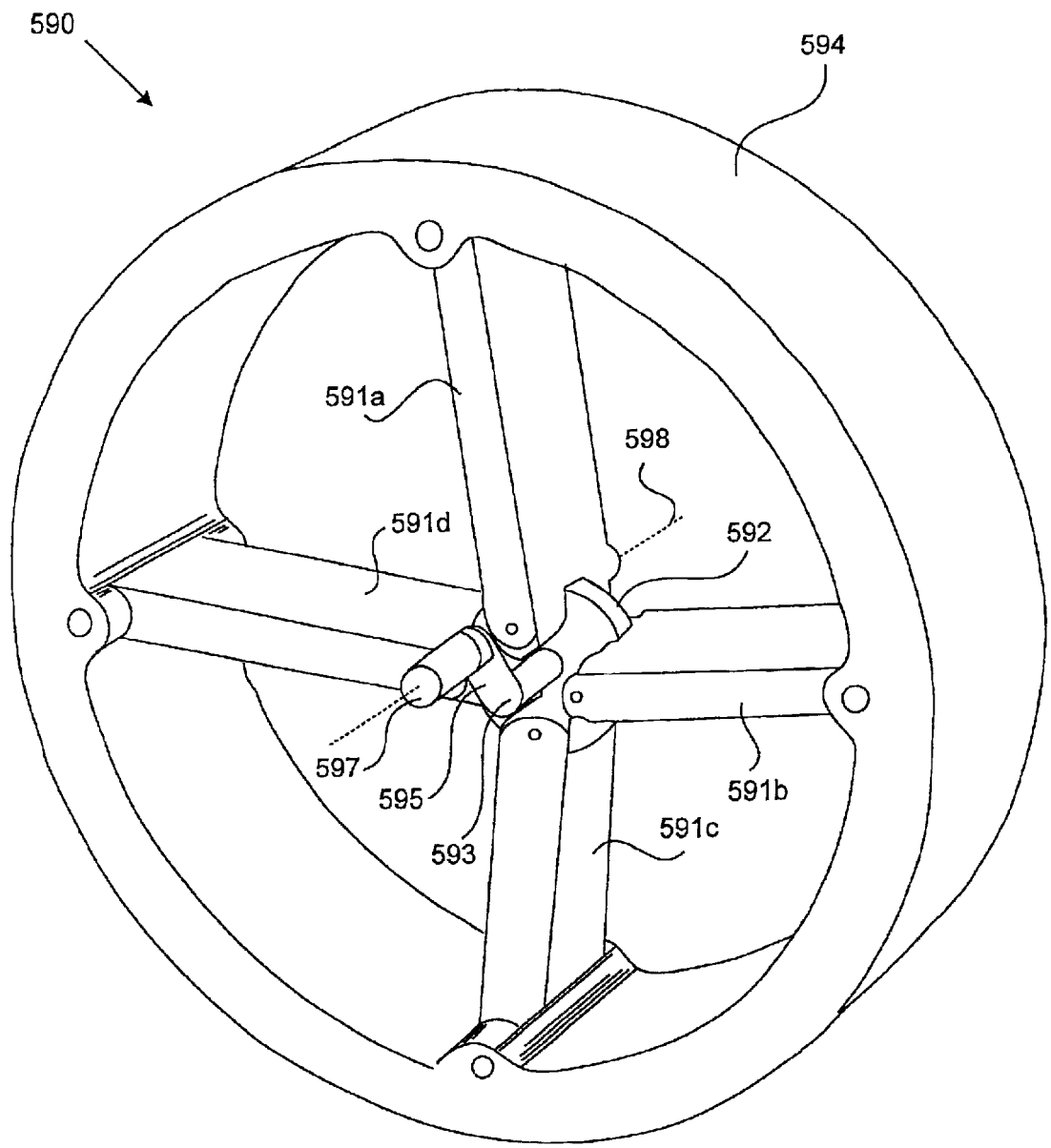
FIG. 3D illustrates a top perspective view of a rotary motor in accordance with another embodiment of the present invention.

FIG. 3D illustrates a top perspective view of a rotary motor 590 in accordance with another embodiment of the present invention. Motor 590 includes four transducers 591*a–d*, each rotably coupled at their proximate end to a separate perimetric portion of disc 592 and each rotably coupled at their distal end to housing 594. Disc 592 is rotably coupled at its center to crank pin 593. Disc 592 interconnects each of the transducers 591*a–d* with crank pin 593. Crank arm 595 transmits force between the crank pin 593 and a power shaft 597, which rotates about axis 598. Each transducer 591 includes an electroactive polymer whose plane is substantially parallel to axis 598. In one embodiment, each transducer 591 is included in an actuator, e.g., the actuator 300 of FIGS. 2J and 2K. Rigid member 310 of actuator 300 may then be rotably coupled to housing 594 while rigid member 308 is rotably coupled to disc 592. Transducers 591*a–d* may be actuated sequentially in a timely manner similar to transducers 522*a–d* of FIGS. 3B–3C to move the crank pin 593 in a circular path about axis 598.

Figure 3F:
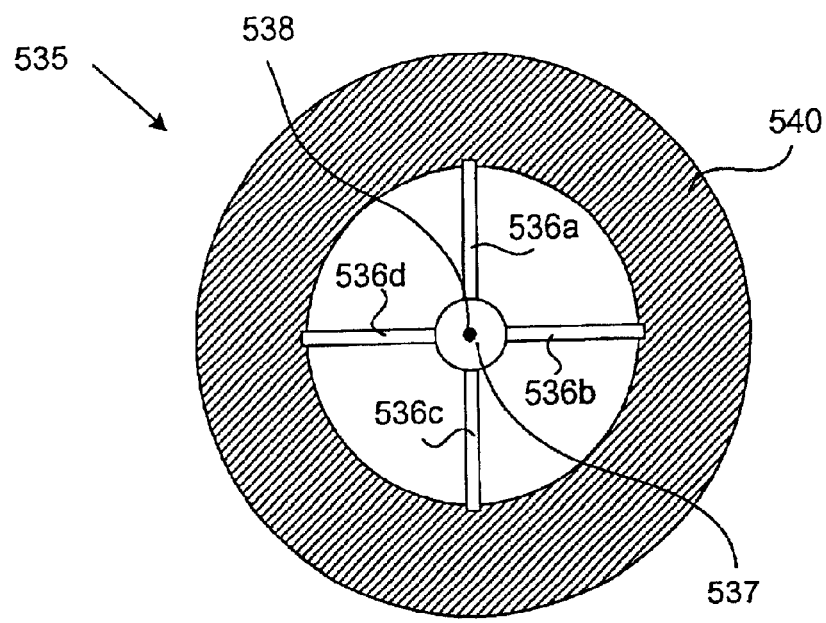
FIGS. 3E–3F illustrate a top perspective view and a front view, respectively, of a transducer configuration for use in a rotary motor in accordance with another embodiment of the present invention.
Figure 3E:
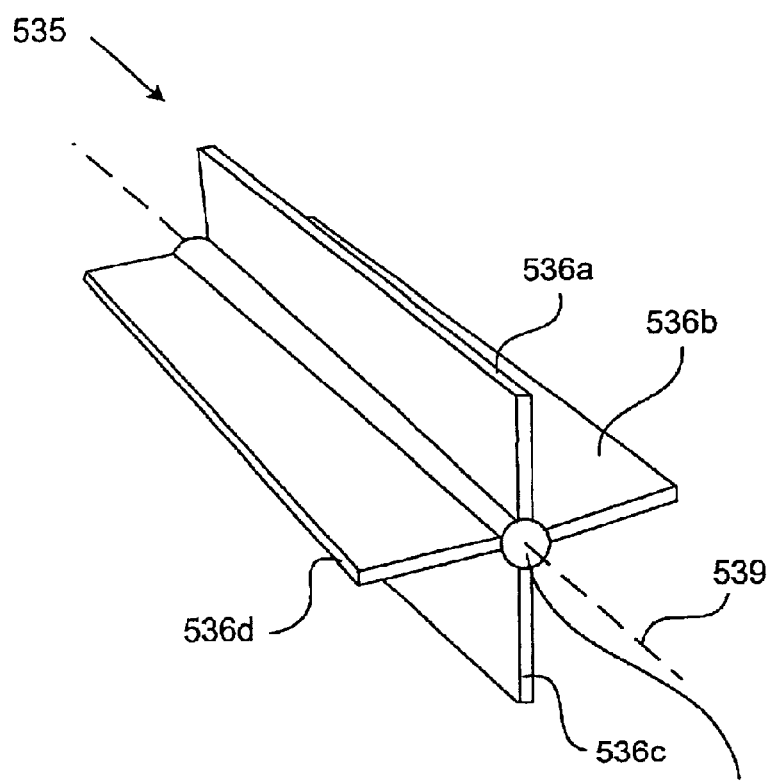

FIGS. 3E–3F illustrate a top perspective view and a front view, respectively, of an elongated transducer configuration 535 for use in a rotary motor in accordance with another embodiment of the present invention. Transducer configuration 535 comprises four transducers 536*a–d* coupled to a connector disc 537. Connector disc 537 includes a pivot point 538 that is used to drive a power shaft. More specifically, pivot point 538 rotatably coupled to a crank pin passing therethrough for transferring deflection of transducers 536*a–d* into rotation of a power shaft about axis 539. Each transducer 536 includes an electroactive polymer whose plane is substantially parallel to axis 539. FIG. 3F also shows a housing 540 that provides stationary support for the distal ends of transducers 536*a–d*.

Motors of the present invention comprising multiple linear transducers and/or linear actuators may be described according to the arrangement of the transducers about the power shaft. In one embodiment, transducers are aligned about a power shaft in an opposed arrangement with all transducers cast in a common plane in two side rows about the power shaft, each opposite the power shaft. In another embodiment, transducers are aligned about power shaft in an in-line arrangement about the power shaft. In yet another embodiment, transducers are aligned about power shaft in a Vee about the power shaft, with two banks of transducers mounted in two inline portions about the power shaft with a Vee angle between them. Transducers in the Vee may have an angle between about 0 degrees and 180 degrees. Multi-input motor arrangements are well-known to one of skill in the art and not detailed herein for sake of brevity.

Motors of the present invention may also comprise a monolithic transducer that provides power to rotate a power shaft. In this case, multiple active areas of the monolithic transducer provide independent forces for rotating the power shaft.

Figures 3G, 3H:
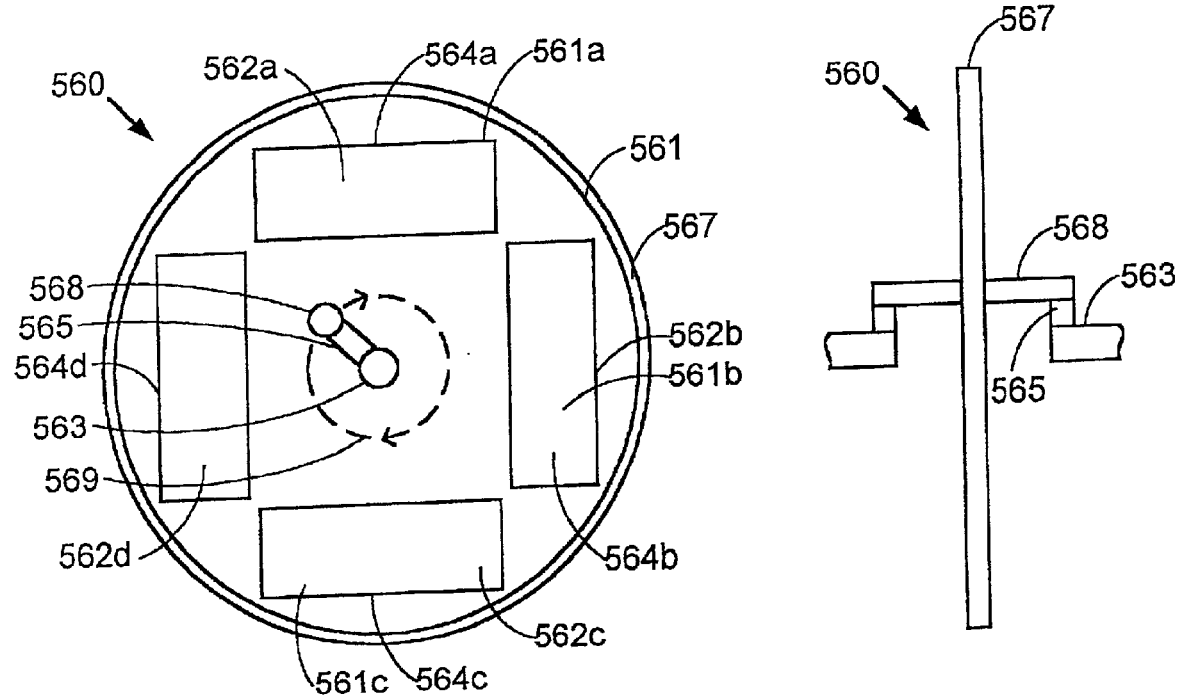
FIGS. 3G–3H illustrate a front view and a side perspective view, respectively, of a motor comprising a plurality of symmetrically arranged active areas on a monolithic transducer in accordance with one embodiment of the present invention.

FIGS. 3G–3H illustrate a front view and a side perspective view, respectively, of a motor 560 comprising a plurality of active areas on a monolithic transducer in accordance with one embodiment of the present invention. Motor 560 includes a monolithic transducer comprising four active areas 562*a–d* symmetrically arranged around a center point of the monolithic transducer. Crank pin 568 is attached to a crank arm 565 that transmits force between the crank pin 568 and power shaft 563. The monolithic transducer deflects crank pin 568 along a circular path 569, thus rotating power shaft 563. The center point of circular path 569 corresponds to the center point of the monolithic transducer as well as the center point and axis of rotation for the power shaft 563.

Each of the active areas 562*a–d* includes top and bottom electrodes 564*a–d* attached to a polymer 561 on its top and bottom surfaces respectively (only the electrodes 564*a–d* on the facing surface of the polymer 561 are illustrated). The electrodes 564*a–d* each provide a voltage difference across a portion of the polymer 561. A first active area 562*a* is formed with the two first active area electrodes 564*a* and a first portion 561*a* of the electroactive polymer. Similarly, a second active area 562*c* is formed with the two second active area electrodes 564*c* and a second portion of the electroactive polymer 561*c*. A similar arrangement applies to the active areas 562*b* and 562*d*.

The electrodes 564*a–d* and their corresponding active areas 562*a–d* are symmetrically and radially arranged the center point of circular path 569 and power shaft 563. Correspondingly, the elasticity of the active areas 562*a–d* is balanced about power shaft 563. As will be described below, the circular path 569 corresponds to a path of substantially constant elastic potential energy for the monolithic transducer of FIG. 3G.

A substantially rigid frame 567 is fixed to the perimeter of the circular polymer 561 using an adhesive. Crank pin 568 is attached to a central portion of polymer 561. Crank pin 568 deflection relative to the rigid frame 567 is thus guided by deflection of the central portion. It should be understood that the central portion of attachment between the crank pin 568 and the polymer 561 may be any portion of the polymer 561 between the active areas 562*a–d*. Crank pin 568 thus deflects via the central portion as determined by actuation of active areas 562*a–d*.

Actuation of the active area 562*a* moves crank pin 568 down. Actuation of the active area 562*b* moves crank pin 568 to the left. Actuation of the active area 562*c* moves crank pin 568 up. Actuation of the active area 562*d* moves crank pin 568 to the right. When electrical energy is removed from the electrodes 564*a*, crank pin 568 elastically returns up to its position before actuation of the active area 562*a*. A similar elastic return occurs for the other active areas 564*b–d*.

The active areas 562 are arranged relative to each other such that elastic energy of one active area facilitates deflection of another. The active area 562*a* is arranged relative to the active areas 562*c* such that elastic energy of the active area 562*a* may facilitate deflection of the active area 562*c*. In this case, contraction of the active area 562*a* at least partially facilitates expansion of the active area 562*c*, and vice versa. More specifically, deflection of the active area 562*a* includes a direction of contraction that is at least partially linearly aligned with a direction of expansion for the active area 562c towards the active area 562a. In another embodiment, the active areas 562a–d are not grouped into opposing pairs. In order for the elastic energy of one active area to facilitate the deflection of another active area, it may only be necessary for the active areas share motion in a common linear direction. In this way the polymer of transducer 560 could have two, three, five or any number of active areas arranged such that the motion of one active area shares a direction with that of another area.

Active areas 562a–d may be actuated sequentially to move crank pin 568 along circular path 569. To achieve this, the active areas 562a–d are actuated sequentially in a timely manner. For example, crank pin 568 may begin at its lowest vertical position with respect to the embodiment shown in FIG. 3G. Electrical energy is then supplied to electrodes 564b while active area 562a elastically contracts; forcing crank pin 568 to rotate clockwise. After crank pin 568 rotates clockwise past its furthest position from active area 564b, electrical energy is then supplied to electrodes 564c while active area 562b contracts. After crank pin 568 clockwise rotates past its furthest position from active area 564c, electrical energy is then supplied to electrodes 564d while active area 562c contracts. A similar timing is applied in actuating the other active areas to produce the circular path 569. This sequential clockwise actuation may be repeatedly performed to continuously move crank pin 568 along the circular path 569. Continuous circular motion of crank pin 568 provides continuous clockwise rotation of the power shaft 563. The active areas 562a–d may also be actuated sequentially to move crank pin 568 counter-clockwise along circular path 569.

Each of the electrode pairs 564a–d are arranged such that they provide independent electrical communication with each of the active areas 564a–d. Independence of the electrodes 564a–d allows electrical energy to be separately supplied to (or removed from) the electrodes 564a–d; thus allowing independent control and separate actuation for each of the active areas 564a–d. In another embodiment, two or more electrodes for a monolithic transducer included in a motor are electrically coupled. In a specific embodiment, electrically coupled electrodes are included in a common electrode. A common electrode is an electrode that is capable of electrically communicating with more than one active area of a transducer. In many cases, a common electrode allows monolithic transducers and motors to be implemented with less complexity. Alternatively, a common electrode may be used to sequentially actuate multiple active areas according to a propagation of the electrical charge through the common electrode.

Figure 3I:
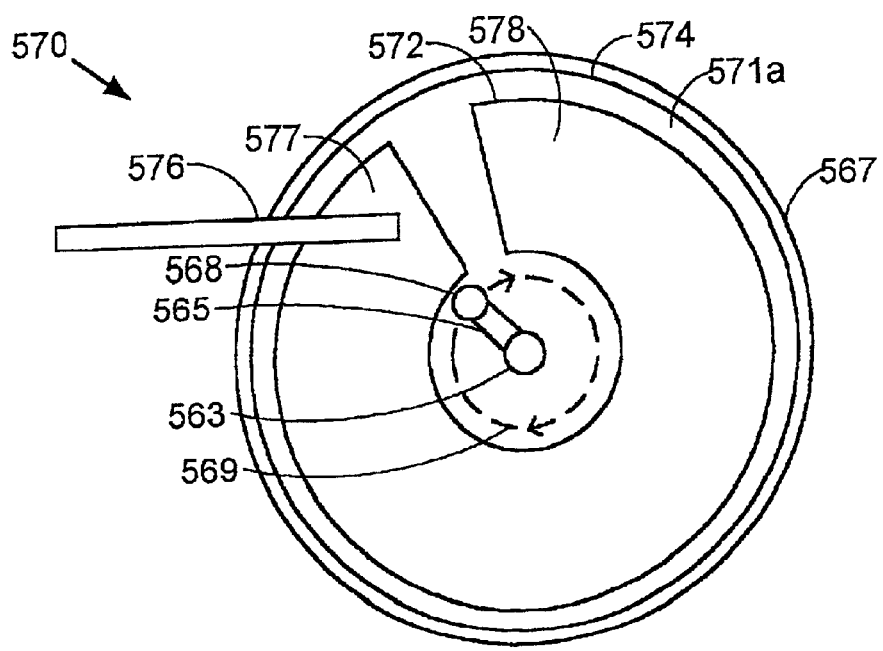
FIGS. 3I and 3J illustrate opposite sides of a motor comprising a monolithic transducer in accordance with another embodiment of the present invention.
Figure 3J:
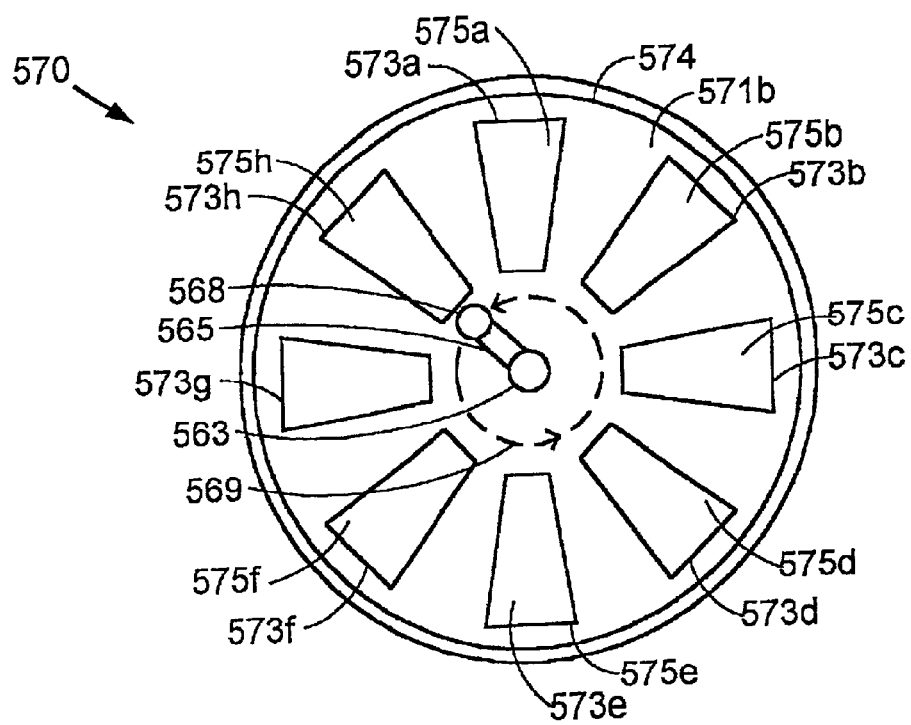

FIGS. 3I and 3J illustrate opposite sides 571a and 571b, respectively, of a motor 570 comprising a monolithic transducer in accordance with another embodiment of the present invention. Motor 570 includes a monolithic transducer comprising a common electrode 572 on the first side 571a of an electroactive polymer 574 (FIG. 3I). Separate electrodes 573a–h are deposited on the opposite surface 571b of the monolithic transducer (FIG. 3J). The monolithic transducer of motor 570 is coupled to a crank similar to the monolithic transducer of motor 560 of FIG. 3G and comprises a crank pin 568 attached to crank arm 565. Crank arm 565 transmits force between the crank pin 568 and power shaft 563, which does not pass through polymer 574. The monolithic transducer deflects crank pin 568 along a circular path 569 and is attached on its perimeter to a rigid frame 567.

Common electrode 572 allows electrical communication with multiple active areas for polymer 574. Common electrode 572 and separate electrodes 573a–h are provided to produce a voltage difference across multiple portions of polymer 574. Separate electrodes 573a–h are shown with relatively large spaces between them for clarity, but it is understood that the individual electrodes can be larger to make more optimal use of the polymer, consistent with the need for electrical isolation. Each of the eight active areas 575a–h is individually formed by each of the eight separate electrodes 573a–h, a portion of the common electrode 572 substantially close to the separate electrode, and a portion of the polymer 574 therebetween. Electrical communication with each of the active areas 575a–h may be independently achieved using the common electrode 572 and one of the separate electrodes 573a–h. For example, active area 575b may be independently actuated using electrode 573b and the common electrode 572.

Each portion of the polymer corresponding to the active areas 575a–h deflects in the plane of the polymer 574 with a change in electric field provided by the common electrode 572 and/or one of the separate electrodes 573a–h. For example, the actuation of active area 575e (FIG. 3J) using electrode 573e and the common electrode 572 causes polymer 571 between the these electrodes to locally expand in the plane, as illustrated in FIG. 3K. When electric energy is removed from active area 575e, there is insufficient electrical energy in the active area 575e to maintain deflection and elastic return of polymer 571 returns the active area 575e to its resting state (FIG. 3I).

In one embodiment, the electrical energy for actuating each of the active areas 575a–h is provided using common electrode 572. In this case, electrical energy is supplied by a lead 576 at the initiating end 577 of common electrode 572 and flows to distal end 578. As electrical energy flows through common electrode 572, each portion of the polymer corresponding to the active areas 575a–h deflects when it has sufficient electrical energy. As charge provided by the lead 576 flows counterclockwise through common electrode 572, portions of polymer 574 having sufficient electrostatic energy will deflect in turn according to a counterclockwise propagation of the charge. Thus, when charge in the common electrode 572 reaches the bottom portion of common electrode 572, polymer 574 deflects as illustrated in FIG. 3K. Crank pin 568 is located ahead of the local propagating polymer deflection is forced to rotate counterclockwise around the power shaft 563 as charge flows counterclockwise through the common electrode 572. Again, a portion of polymer 574, such as an end or edge of polymer 574, may be grounded, attached to a fixed element, or otherwise fixed relative to power shaft 506 rotation. In another embodiment, a common electrode 572 is deposited on both sides of polymer 574.

FIG. 3J illustrates the electrodes such that it appears that the electrodes are patterned evenly and then the shaft is connected. More typically; the electrodes are evenly patterned on the polymer, pin 568 is connected at the center of the polymer and then shifted so that shaft 563 is now at the profile center. Functionally, this will make circular path 569 a constant elastic energy path to first order. In the FIG. 3J illustration, this arrangement would show the electrode 573 nearest pin 568, i.e. electrode 573h and active area 575h, compressed, and the opposite electrode 573h and active area 575d stretched]

Although FIGS. 3I–K show a crank pin included a rotary motor coupled to only a single monolithic transducer, the present invention may include multiple monolithic transducers that drive a single crank pin.

FIGS. 3L–3M illustrate a side view and a front view, respectively, of a motor 580 in accordance with another embodiment of the present invention. Motor 580 comprises three monolithic transducers 581, 582 and 583 rotably coupled in parallel to a crank pin 584. Monolithic transducer 581 comprises two opposing and symmetric active areas 585a and 585b. Monolithic transducer 582 comprises two opposing and symmetric active areas 586a and 586b. Monolithic transducer 583 comprises two opposing and symmetric active areas 587a and 587b. Monolithic transducer 582 is rotably coupled to crank pin 584 at a 60 degree rotated angle relative to coupling of monolithic transducer 581 to crank pin 584. Similarly, monolithic transducer 583 is rotably coupled to crank pin 584 at a 60 degree rotated angle relative to monolithic transducer 582. As a result, active areas 585 on monolithic transducer 581 are offset from active areas 586 on monolithic transducer 582, as illustrated in FIG. 3M. Similarly, active areas 587 on monolithic transducer 583 are further offset from active areas 586 on monolithic transducer 582. In one embodiment, the crank arms for each polymer are staggered so that each actuator layer drives the crank arm with a motion orthogonal to the crank arm, as is done in many automotive engine multi-cylinder systems.

Since the monolithic transducers of FIG. 3G may produce uneven power distribution for rotating crank pin 568 about power shaft 563, offsetting active areas as illustrated in FIGS. 3L–3M may produce a more consistent flow of power for motor 580. More specifically, active areas 585a and 585b may produce less deflection and power in direction 589a than orthogonal direction 589b. Similarly, monolithic transducer 582s and 583 produce increased power in a direction between their respective opposing active areas. By offsetting the active areas and power distribution for each monolithic transducer as shown, a more consistent and continuous flow of power for the motor 580 may result, thus reducing dead spots in rotation of crank pin 584 and corresponding power shaft 589.

Although FIGS. 3A–M show one or more transducers coupled to a single crank pin, motors of the present invention may include multiple crank pins, or multiple throws, each coupled to one or more transducers.

FIG. 3N illustrates a top perspective view of an exemplary motor 640 comprising a plurality of cranks arranged substantially equally about a crankshaft 641 in accordance with a specific embodiment of the present invention. The six crank crankshaft 641 includes six crank pins 642a–f set 120 degrees apart, with each crank pin dedicated to a single transducer 644. More specifically, crank pin 642a is dedicated to transducer 644a (transducer 1), crank pin 542b is dedicated to transducer 644b (transducer 2), crank pin 542c is dedicated to transducer 644c (transducer 3), crank pin 542d is dedicated to transducer 644d (transducer 4), crank pin 542e is dedicated to transducer 644e (transducer 5), and crank pin 542f is dedicated to transducer 644f (transducer 6). The crank pins for transducers 1 and 6, 2 and 5, and 3 and 4 are in line with each other, as illustrated. To provide a continuous flow of power for crankshaft 641, the transducers actuate in the following order: 1-5-3-6-2-4. Again, a portion of each polymer 644, such as an end or edge of each polymer 644, may be grounded, attached to a fixed element, or otherwise fixed relative to the power shaft rotation.

The present invention may encompass any suitable number of cranks arranged in a suitable manner around the power shaft. In one embodiment, transducers are arranged around the power shaft such that they counterbalance each other. Crank arrangements are well-known in the art and not detailed herein for sake of brevity.

The crank pins 642 are attached to crankshaft 641. To improve consistent power output of crankshaft 641, a mechanism is used to assist rotation of the crankshaft 641. In this case, flywheel 646 is mounted to crankshaft 641 to assist rotation thereof. Flywheel 646 stores rotational energy during power impulses of transducers 644 and releases this energy between power impulses, thus assuring less fluctuation in motor power and/or speed and smoother motor operation. The size of flywheel 646 will vary with the number of transducers and general construction of the motor 640. With a large number of transducers and the consequent overlapping of power impulses, there is less need for a flywheel; consequently, flywheel 646 can be reduced in size or eliminated. Alternatively, flywheel 646 is useful when a load attached to motor 640 is changing in force. In this case, flywheel 646 helps smooth out the speed variations introduced by the load variations.

Figure 3O:
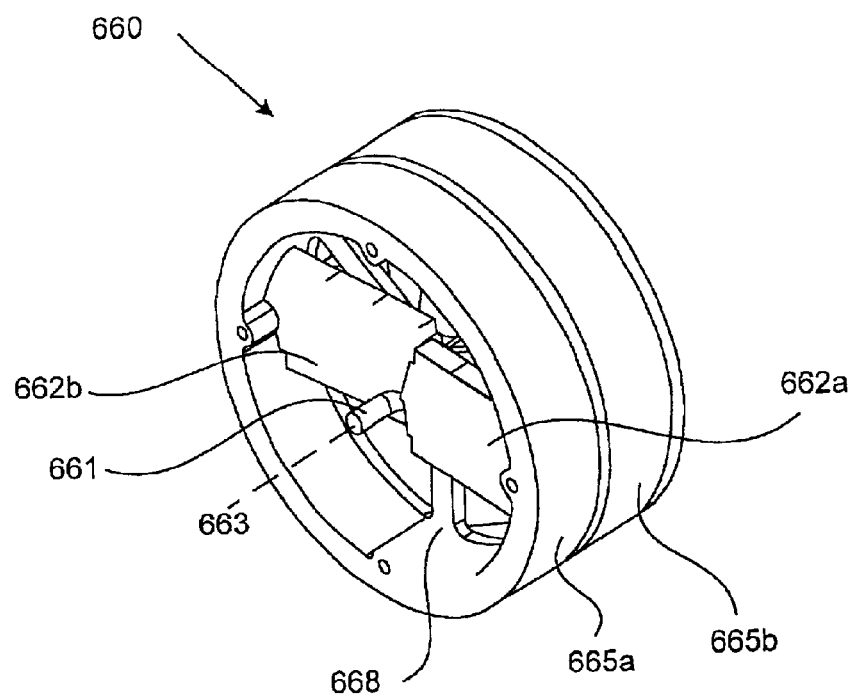
FIGS. 3O–Q illustrate a top perspective view, front view, and side view, respectively of a rotary motor in accordance with another embodiment of the present invention.
Figure 3P:
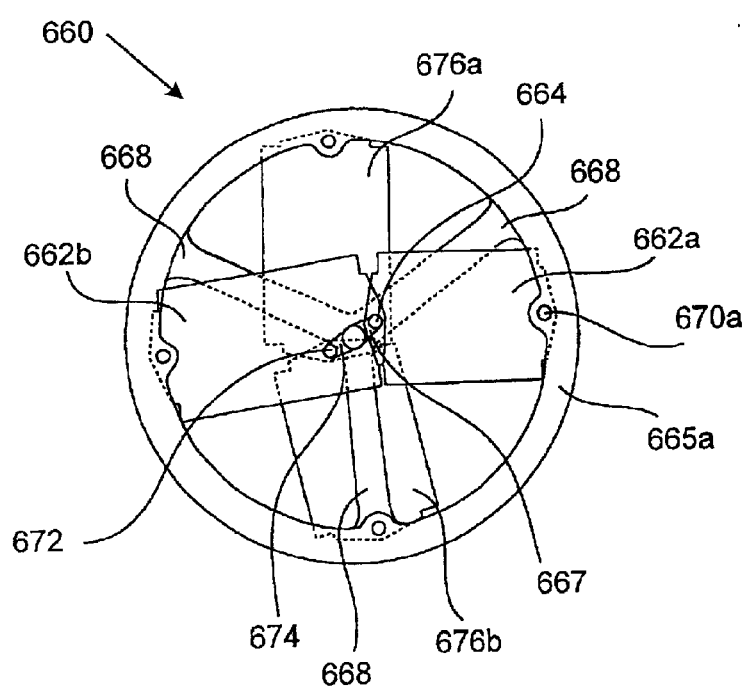
Figure 3Q:
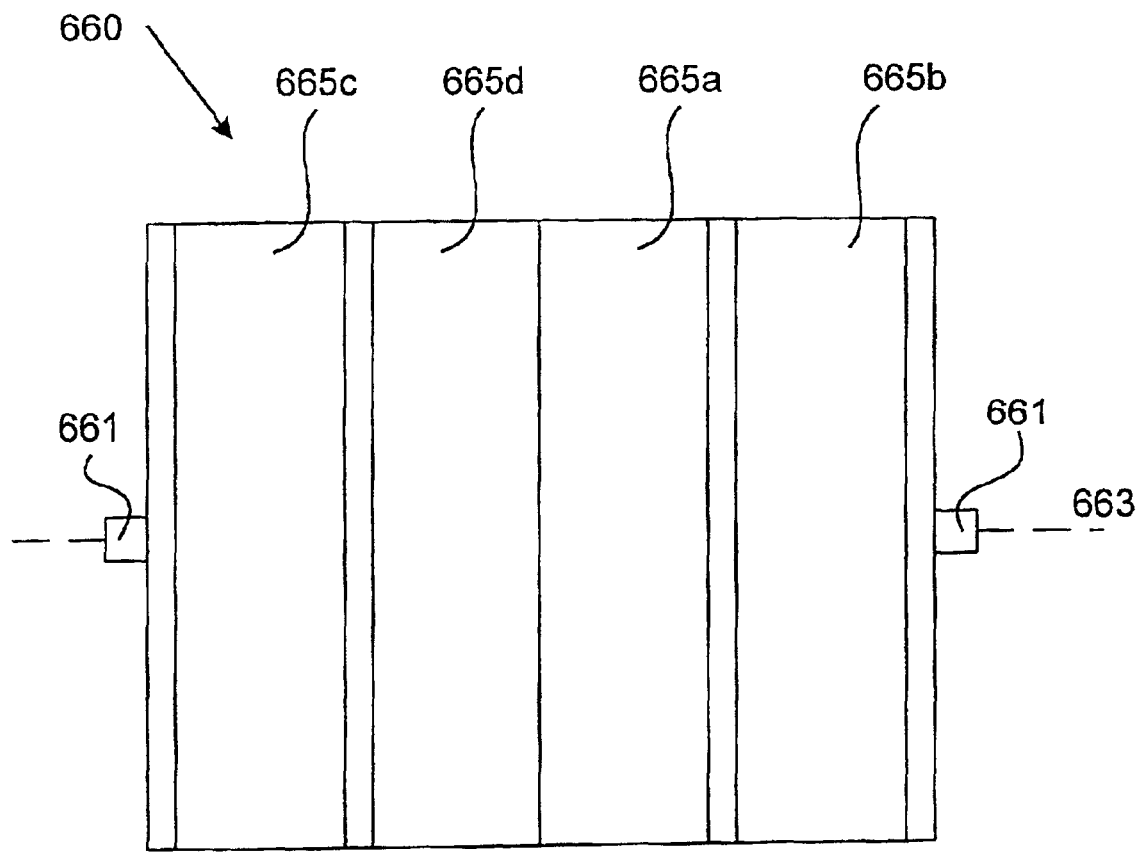

FIGS. 3O, 3P, and 3Q illustrate a top perspective view, a front view, and a side view, respectively, of a modular rotary motor 660 in accordance with another embodiment of the present invention. Modular motor 660 comprises a plurality of modular cranks arranged substantially equally about a crankshaft 661. As shown, crankshaft 661 comprises two cranks having crank arms 667 and 674 set 180 degrees apart. Each crank also includes a crank pin dedicated to two transducers and a modular housing 665. Crankshaft 661 rotates about axis 663, which corresponds to the axis of rotation for each of the crank arms in motor 660.

A first crank comprises crank pin 664, crank arm 667, and two transducers 662a–b. Each transducer 662a–b is rotably coupled at its proximate end to crank pin 664 and each rotably coupled at their distal end to housing 665a. More specifically, transducer 662a is rotably coupled to crank pin 664 via a bearing and rotably coupled at its other end to housing 665a via pin joint 670a. Housing 665 provides support for each of the transducers included attached thereto and includes radial supports 668 rotably coupled (via bearings not shown) with crankshaft 661 to provide support for crankshaft 661. Transducers 662a–b are symmetrically arranged such that their resting position coincides with axis 663.

A second crank comprises crank pin 672, crank arm 674, and two transducers 676a–b. Each transducer 676a–b is rotably coupled at its proximate end to crank pin 664 and each rotably coupled at their distal end to housing 665b. Transducers 676a–b are symmetrically arranged such that their resting position coincides with axis 663, and rotated 90 degrees from transducers 662a–b to provide consistent and continuous flow of power for crankshaft 661.

The plane of each transducer 662a–b and transducer 676a–b lies perpendicular to axis 663. One advantage of the motor 660 is that each crank and housing 665 is substantially planar and relatively thin. This allows modular expansion and addition of more cranks. More specifically, as seen in FIG. 3Q, by adding more crank pins to crankshaft 661, and attaching more housings 665c and 665d in parallel, motor 660 may comprise any number of electroactive polymer powered cranks in parallel in order to increase or smooth the force output over the two crank system shown.

6. Energy Features

Electroactive polymer material provides a spring force during deflection. Typically, polymer material resists deflection during actuation because of the net increase (counting active and inactive areas) in elastic energy. Removal of the actuation voltage and the induced charge causes the reverse effects. In general, when actuation voltages and any external loads are removed, electroactive polymers, or portions thereof, elastically return to their resting position. In one aspect of the present invention, elastic properties of one or more portions of an electroactive polymer, and any energy contribution of external loads, are used to assist power shaft rotation.

In one embodiment, a motor of the present invention is arranged such that deflection of a polymer in response to a change in electric field is at least partially assisted by mechanical input energy. As the term is used herein, mechanical input energy refers to mechanical energy that contributes to deflection of a portion of an electroactive polymer. The mechanical input energy provided to a portion of an electroactive polymer may include elastic energy provided by another portion of the electroactive polymer, a portion of another electroactive polymer, a spring, etc. The mechanical input energy may also include energy provided an external load or mechanism coupled to the electroactive polymer, e.g., a flywheel coupled to the power shaft 563. The energy may also be provided without using a separate device, for example by exploiting the rotational energy stored in the shaft or by exploiting the inertial energy of the polymer mass or connection mass(es).

Cumulatively, the sum of elastic energy in a transducer or motor at a given instant of time may be referred to as the elastic potential energy of the transducer or motor. Elastic potential energy may be used to describe transducers and motors of the present invention and methods of deflecting these transducers and devices. In one embodiment, a motor is arranged such that deflection of an electroactive polymer is substantially independent of elastic potential energy. In this case, changes in elastic energy of one or more portions of an electroactive polymer are balanced by the changes in elastic energy in the remainder of the transducer or motor. Since the deflection does not cause a substantial change in the net elastic potential energy of the device, the deflection can be made with relatively little input electrical energy, even though the individual elastic forces internal to the device might be relatively larger. Mechanical input energy and substantially independent elastic potential energy deflection are described in further detail in copending U.S. patent application Ser. No. 09/779,373, which is incorporated by reference for all purposes.

The motor 560 of FIG. 3G may be used to demonstrate mechanical input energy and substantially constant elastic energy deflection in accordance with one embodiment of the present invention. The motor 560 includes an equipotential line corresponding to the circular path 569 assuming the crank pin 568 is initially connected to the exact center of the film in its relaxed state, then deflected to path 569. When the active areas 562 move the crank pin 568 along circular path 569, elastic potential energy of the motor 560 is substantially independent of the position of the crank pin 568 on circular path 569. In other words, the elastic potential energy of the motor 560 remains substantially constant as the crank pin 568 moves along circular path 569. This is apparent because if the crank pin 568 is initially connected to the center of the relaxed film, then any point along circular path 569 corresponds to the same deflection of the relaxed center, just in different directions. Since the film is symmetric, the deflection of the pin 568 about the center in one direction will yield approximately the same total elastic energy as a similar deflection about the center in a different direction. The elastic energy would be exactly the same for a perfectly elastic film, but creep and other non-linear effects make the equality only approximate. As a result of this elastic energy balance, electrical input used for actuation of the motor 560 does not need to overcome elastic energy of the polymer 561 as the crank pin 568 moves along circular path 569.

In one embodiment, the crank of motor 560 is a substantially loss-less motion constraint that constrains the deflection of the crank pin 568 along circular path 569. The rigid motion constraint provides the necessary forces perpendicular to circular path 569 at any given point to offset the elastic forces in that direction.

Deflection of the motor 560 includes mechanical input energy from different portions of the polymer 561. The mechanical input energy includes elastic energy contributions provided by contractions and expansions of each of the active areas 562 and portions of the polymer 561 outside the active areas 562. A motion constraint such as crank 565 does not provide any mechanical input energy by itself, but it provides mechanical forces perpendicular to motion on an equipotential elastic energy line to assist actuation by holding the motion to a path of substantially constant elastic energy, and thereby eliminate the need for the expansion and contraction of the polymer to provide these forces. The amount of mechanical input energy and timing of actuation may vary. In one embodiment, the total mechanical input energy provided by different portions of the polymer 561 is substantially equal to the elastic energy required to deflect the first active area 562a for a part of the deflection. In another embodiment, the total mechanical input energy provided by different portions of the polymer 561 is substantially equal to the elastic energy required to deflect the first active area 562a for an entire deflection corresponding to an actuation of one of the active areas 562.

For deflection along circular path 569, the change in total elastic energy for stretching portions of the polymer 561 during actuation of one or more of the active areas 562a–d is substantially equal to the change in magnitude of the total elastic energy of contracting portions of the polymer 561. With the elastic energy balanced between the different portions of the polymer 561 along circular path 569, the mechanical output energy for motor 560 is greater for a given input voltage compared to an arrangement where the elastic energy is not balanced. In addition, an external load (e.g., the flywheel described above) coupled to crank pin 568 may also assist the crank pin 568 to provide an alternate source of energy to overcome changes in elastic energy. The flywheel can add or subtract the energy needed to make pin 568 move around circular path 569 in spite of small changes in elastic energy, and thus reduce the amount of elastic energy that needs to be provided by electrical actuation of the polymer.

An active area may include multiple directions of contraction and expansion. Correspondingly, elastic energy generated during actuation of one active area may used to facilitate deflection of more than one other active area. For motor 560, active areas 562 are arranged relative to each other such that elastic return of one active area 562a–d may facilitate deflection of more than one other active area 562a–d in a direction of actuation. More specifically, active areas 562a and 562c are arranged such that contraction of the active area 562a may facilitate expansion of the active area 562c in a direction towards the active area 562a. In addition, active areas 562a and 562b are arranged such that contraction of the active area 562a may facilitate expansion of the active area 562b in a direction towards the active area 562a.

The timing of deflection between active areas may affect elastic energy transfer therebetween. To increase elastic energy transfer for the motor 560, the active areas 561a–d may be actuated at a high enough rate such that elastic return of one active area assists the deflection of more than one active area subsequently actuated. This may be useful for active areas having more than one direction of actuation. For example, to increase elastic energy transfer to the active areas 562b and 561c, actuation of active areas 562b and 561c may begin actuation during elastic return of active area 561 a In this manner, elastic energy generated during actuation of active area 562a is transferred to two active areas 562b and 562c actuated thereafter. A similar timing may be continuously applied as the active areas 562a–d are actuated in turn.

For the motor 560, there is a complementary nature of the active areas 562a–d on opposite sides of the crank pin 568. It should be noted that active areas and transducers for a motor need not be grouped in complementary pairs as described with the motor 560. For example, an odd number of active areas and transducers arranged around the crank pin 568 may still employ the elastic energy balance and mechanical input energy features described above. More specifically, three active areas arranged around the crank pin 568 at 120 degree intervals (or transducers as in FIG. 3N) may still employ the elastic energy balance and mechanical input energy features described above. In this case, the expansion of one active area/transducer is paired with the contraction of more than one other active area/transducer.

In another embodiment, multiple electroactive polymers in a motor are arranged such that elasticity of the polymers is balanced (e.g., FIG. 3B). Further, active areas on the multiple polymers may be arranged such that the active areas are elastically balanced (e.g., FIG. 3M). In yet another embodiment, a plurality of active areas are symmetrically arranged on multiple polymers of a motor (e.g., FIG. 3N). Advantageously, transferring elastic energy between polymers may eliminate the need for electroactive forces generated by electrodes to overcome some of the elastic resistance of one of the polymers. In some cases, elastic energy may be transferred between polymers without external assistance. In other cases, one or more external mechanisms may be used to transfer elastic energy of one polymer to another. The mechanisms may include cables, belts, pulleys, levers, etc.

7. Performance

Performance of a motor described herein may be described similar to conventional motor designs by parameters such as force output, power output, weight, efficiency, etc. The performance of motors comprising an electroactive polymer may also be described with parameters that may not be present in many conventional motor technologies.

Unlike conventional motor technologies whose power generation element provides a constant stroke, it should be noted that electroactive polymers are capable of providing varying deflection distances and stroke lengths. Thus, when coupled to a power shaft included in a motor, a transducer in accordance with the present invention is capable of varying deflection distances and stroke lengths. The transducer may then include a first deflection that rotates the power shaft a first amount corresponding to the first deflection, and a second deflection that rotates the power shaft a second amount corresponding to the second deflection. The second deflection may be greater or less than the first deflection and may be used to vary the output of the motor.

Electroactive polymer powered motors may be characterized in terms of the motor by itself or the performance of the motor in a specific application. Characterizing the performance of a motor by itself may relate to the material properties of the polymer included therein as well as the particular motor design.

As mentioned earlier with respect FIG. 1A, when a polymer expands as a result of electrostatic forces, it continues to expand until mechanical forces balance the electrostatic pressure driving the expansion. When a load is attached to a motor of the present invention, mechanical effects provided by the load will influence the force balance and deflection of the polymer—and thus influence rotation of the output power shaft. For example, if the load resists rotational deflection of the power shaft, then the electroactive transducer may not deflect as much as if were there no load. If the load is too large for the transducers driving the power shaft, the motor may stall at a stall position. Conventional electric motor technologies that rely on moving charge for electromechanical conversion still have current flowing at a stall position. When left at a stall position for extended periods of time, these conventional electric motor technologies often overheat and damage the motor. In contrast, electroactive polymer powered motors of the present invention rely on electrostatic forces and may not have current flowing at a stall position. Thus, the power shaft of a motor of the present invention may include a stall position that is maintained with substantially no electrical current to the electrodes. This advantageously avoids overheating associated with conventional electric motor motors.

The time for a polymer to rise (or fall) to its maximum (or minimum) actuation pressure is referred to as its response time. Transducers in accordance with the present invention may accommodate a wide range of response times. Depending on the size and configuration of the polymer, response times may range from about 0.01 milliseconds to 1 second, for example. A polymer excited at a high rate may also be characterized by an operational frequency. In one embodiment, maximum operational frequencies suitable for use with the present invention may be in the range of about 100 Hz to 100 kHz. Thus, motors of the present invention may have very good temporal response and control.

In one embodiment, one or more transducers included in a motor are actuated in resonant mode (e.g., the motor 660 of FIG. 3O). Operating an electroactive polymer at resonance using materials, such as silicone, with low losses (e.g., low viscoelastic losses) allows energy available from the elastic return to stay in the electroactive polymer in the form of resonant mode vibration or kinetic energy for use in a subsequent actuation. In another embodiment, a motor includes a spring that facilitates elastic return of the electroactive polymer, e.g., a spring that facilitates elastic return of transducer 662a.

The performance of an electroactive polymer motor as described herein may also be adapted using one or more conventional techniques. For example, a gear chain may be used to reduce the speed and increase the torque available from the motor. For applications requiring linear actuation, a rack or ball screw mechanism may convert the high torque rotary motion of an electroactive polymer motor into linear motion. For example, a small motor can be attached to lead screw to produce a slow but high-force and high-stroke linear actuator. Linear actuators powered by an electroactive polymer motor in this manner may also include a stroke independent of the deformation of the polymer. More direct methods of linear motion may also be used to form a linear motor. For example, a polymer linear actuator may be combined with two actuated clamps that can clamp an output shaft. One clamp is located at the "fixed" base of the linear actuator and the second is located at the moving end of the actuator. By timing the clamping action of the two clamps relative to the linear actuation of the polymer actuator, the shaft can be moved in an "inchworm-type"

fashion. Similarly, a linear clutch may be used to rectify the oscillatory motion of a polymer actuator to a constant linear motion in one direction. If the clutch may be electrically engaged and disengaged, and a second such clutch is also included, then by selectively engaging the proper clutch the output shaft can be moved in either direction.

8. Applications

As the present invention includes transducers that may be implemented in both the micro and macro scales, and with a wide variety of motor designs, the present invention finds use in a broad range of applications where conversion between electrical and mechanical power is required. As one of skill in the art will appreciate, there are countless applications for motors. Broadly speaking, motors of the present invention may find use in any application requiring continuous mechanical output. These applications include robotics, pumps, animatronics, etc.

Due to the weight savings gained by using electroactive polymers in producing mechanical energy for a motor, the present invention is well-suited for applications that require a light weight motor. For example, the present invention is well-suited for applications that require a light weight motor that can operate at low speeds and yet obtain high-performance from the electroactive polymer materials. There are countless applications for a light weight, low rpm, and efficient motor. In addition, the present invention is well-suited for applications that require a motor that can operate at high speeds and with low-torque. Further, the light weight gained by using a motor powered by an electroactive polymer allows improvements to many applications where weight of the motor is important to design. For example, remote-controlled cars that rely on one or more motors for power may require less electrical energy to power a lighter vehicle—thus allowing a smaller battery or the same battery to operate for a longer duration.

9. Conclusion

While this invention has been described in terms of several preferred embodiments, there are alterations, permutations, and equivalents that fall within the scope of this invention which have been omitted for brevity's sake. By way of example, although the present invention has been described in terms of several numerous applied material electrodes, the present invention is not limited to these materials and in some cases may include air as an electrode. It is therefore intended that the scope of the invention should be determined with reference to the appended claims.

What is claimed is:

1. A mechanical-electrical power conversion system comprising:
   a power shaft configured to rotate about an axis; and
   a crank comprising:
      a crank pin,
      a crank arm that transmits force between said crank pin and said power shaft, and
      a first transducer coupled to said crank pin, the first transducer comprising a first active area, which includes at least a first portion of an electroactive polymer and at least two first active area electrodes coupled to the first portion of the electroactive polymer and a support structure for securing and for directing a mechanical output derived from the electroactive polymer.

2. The system of claim 1 wherein said power shaft includes a stall position that is maintained with substantially no electrical current to said first active area electrodes.

3. The system of claim 1 further including a connecting rod that interconnects said electroactive polymer and said crank pin.

4. The system of claim 1 wherein a plane of said electroactive polymer is substantially parallel to said axis.

5. The system of claim 1 wherein said first transducer is included in an actuator.

6. The system of claim 5 wherein said actuator applies translational motion to said crank pin, which in turn rotates said power shaft to provide power output thereon.

7. The system of claim 1 further including a second transducer operably coupled to said crank pin.

8. The system of claim 7 wherein said first transducer and said second transducer are arranged in a V about said power shaft, the V having an angle between about 0 degrees and 180 degrees.

9. The system of claim 7 wherein said first transducer and said second transducer are arranged in-line about said power shaft.

10. The system of claim 7 further including a disc that couples said first transducer and said crank pin and couples said second transducer and said crank pin.

11. The system of claim 1 wherein said crank is included in a plurality of cranks mounted concentrically on said power shaft, said plurality of cranks comprising a second crank, the second crank comprising:
   a second crank pin
   a second crank arm that transmits force between said second crank pin and said power shaft; and
   a second transducer coupled to said second crank pin, the second transducer comprising a second active area, which includes at least a first portion of a second electroactive polymer and at least two electrodes coupled to the first portion of the second electroactive polymer and a second support structure for securing and for directing a mechanical output derived from the second electroactive polymer.

12. The system of claim 11 wherein said plurality of cranks are arranged substantially equally about said power shaft and arranged to rotate about said axis.

13. The system of claim 11 wherein said first transducer is a first monolithic transducer and said second transducer is a second monolithic transducer.

14. The system of claim 13 wherein active areas of the first monolithic transducer are offset from active areas of the second monolithic transducer.

15. The system of claim 11 wherein deflection of said electroactive polymer and said second electroactive polymer along a path provided by the crank arm is substantially independent of elastic potential energy of said electroactive polymer and said second electroactive polymer.

16. The system of claim 1 wherein the first transducer comprises a second active area comprising at least two second active area electrodes and a second portion of the electroactive polymer coupled to the at least two second active area electrodes.

17. The system of claim 16 wherein the first and second active areas of the first transducer are symmetrically arranged around said power shaft.

18. The system of claim 16 wherein the at least two first active area electrodes and the at least two second active area electrodes of the first transducer are arranged radially around said power shaft.

19. The system of claim 16 wherein elastic potential energy stored in the second portion of said electroactive polymer during actuation of the second active area at least partially contributes to deflection of the first portion of said electroactive polymer.

20. The system of claim 16 wherein deflection of said electroactive polymer along a path provided by the crank arm is substantially independent of elastic potential energy of said electroactive polymer.

21. The system of claim 16 wherein one of the at least two first active area electrodes and one of the at least two second active area electrodes are in electrical communication.

22. The system of claim 21 wherein said one of the at least two first active area electrodes and said one of the at least two second active area electrodes are included in a common electrode.

23. The system of claim 16 wherein rotation of said power shaft is assisted by mechanical input energy.

24. The system of claim 1 wherein the support structure secures a portion of the electroactive polymer with a first surface area at a first position and wherein the portion of the polymer is stretched from an initial surface to the first surface area to improve the mechanical response of the transducer when it deflects from the first position and wherein the support structure is for supplying a force to the stretched portion of the polymer that prevents the stretched portion of the electroactive polymer from returning from the first surface area to about its initial surface area.

25. The system of claim 1 further comprising a mechanism that assists rotation of the power shaft.

26. The system of claim 25 wherein the mechanism is a flywheel.

27. The system of claim 1 wherein said first transducer is capable of rotating said power shaft in both rotational directions about said axis.

28. The system of claim 1 wherein elastic return of said electroactive polymer contributes to rotation of said power shaft.

29. The system of claim 28 further comprising a device for coupling an external load to the electroactive polymer that increases elastic strain of said electroactive polymer.

30. The system of claim 1 further including a bearing between said electroactive polymer and said crank pin that allows the electroactive polymer to rotate about said crank pin.

31. A mechanical-electrical power conversion system comprising:
a power shaft configured to rotate about a fixed axis; and
a crank comprising:
a crank pin,
a crank arm that transmits force between said crank pin and said power shaft, and
a first transducer coupled to said crank pin, the first transducer comprising a first active area, which includes at least a first portion of an electroactive polymer and at least two first active area electrodes coupled to the first portion of the electroactive polymer and a support structure for securing and for directing a mechanical output of the electroactive polymer wherein the support structure secures a portion of the electroactive polymer with a first surface area at a first position of the first transducer and wherein the portion of the polymer is stretched from an initial surface area to the first surface area to improve the mechanical response of the first transducer when it deflects from the first position and wherein the support structure is for supplying a force to the stretched portion of the electroactive polymer that prevents the stretched portion of the electroactive polymer from returning from the first surface area to about its initial surface area.

32. The system of claim 31 wherein said power shaft includes a stall position that is maintained with substantially no electrical current to said first active area electrodes.

33. The system of claim 31 wherein a plane of said electroactive polymer is substantially parallel to said fixed axis.

34. The system of claim 31 wherein said electroactive polymer is a dielectric elastomer.

35. The system of claim 31 wherein said first transducer is capable of rotating said power shaft in both rotational directions about said fixed axis.

36. The system of claim 31 further comprising a device for coupling an external load to the electroactive polymer that increases elastic strain of said electroactive polymer.

37. A mechanical-electrical power conversion system comprising:
a power shaft configured to rotate about a fixed axis; and
a crank comprising:
a crank pin,
a crank arm that transmits force between said crank pin and said power shaft, and
a first transducer coupled to said crank pin, the first transducer comprising a first active area, which includes at least a first portion of an electroactive polymer and at least two first active area electrodes coupled to the first portion of the electroactive polymer. and a support structure for securing and for directing a mechanical output of the electroactive polymer wherein elastic return of said electroactive polymer at least partially contributes to rotation of said power shaft.

38. The system of claim 37 wherein said power shaft includes a stall position that is maintained with substantially no electrical current to said first active area electrodes.

39. The system of claim 37 wherein said first transducer is included in an actuator.

40. The system of claim 39 wherein said actuator applies translational motion to said crank pin, which in turn rotates said power shaft to provide power output thereon.

41. The system of claim 37 wherein said crank is included in a plurality of cranks mounted concentrically on said power shaft, said plurality of cranks comprising a second crank, the second crank comprising:
a second crank pin
a second crank arm that transmits force between said second crank pin and said power shaft; and
a second transducer coupled to said crank pin, the second transducer comprising a second active area, which includes at least a first portion of a second electroactive polymer and at least two electrodes coupled to the first portion of the second electroactive polymer and a second support structure for securing and for directing a mechanical output derived from the second electroactive polymer.

42. The system of claim 41 wherein said plurality of cranks are arranged substantially equally about said power shaft and arranged to rotate about said fixed axis.

43. The system of claim 41 wherein said first transducer is a first monolithic transducer and said second transducer is a second monolithic transducer.

44. The system of claim 43 wherein active areas of the first monolithic transducer are offset from active areas of the second monolithic transducer.

45. The system of claim 41 wherein deflection of said electroactive polymer and said second electroactive polymer along a path provided by the crank arm is substantially independent of elastic potential energy of said electroactive polymer and said second electroactive polymer.

46. The system of claim 37 wherein the transducer comprises a second active area comprising at least two second active area electrodes and a second portion of the electroactive polymer coupled to the at least two second active area electrodes.

47. The system of claim 46 wherein the first and second active areas of the first transducer are symmetrically arranged around said power shaft.

48. The system of claim 46 wherein the at least two first active area electrodes and the at least two second active area electrodes of the first transducer are arranged radially around said power shaft.

49. The system of claim 46 wherein elastic potential energy stored in the second portion of said electroactive polymer during actuation of the second active area at least partially contributes to deflection of the first portion of said electroactive polymer.

50. The system of claim 46 wherein deflection of said electroactive polymer along a path provided by the crank arm is substantially independent of elastic potential energy of said electroactive polymer.

51. The system of claim 37 further comprising a device for coupling an external load to the electroactive polymer that increases elastic strain of said electroactive polymer.

52. The system of claim 31 wherein said electroactive polymer is a dielectric elastomer.

53. A mechanical-electrical power conversion system comprising;
   a power shaft configured to rotate about an axis; and
   a crank comprising:
      a crank pin,
      a crank arm that transmits force between said crank pin and said power shaft, and
      a transducer coupled to said crank pin, the transducer comprising a first active area, which includes at least a first portion of an electroactive polymer and at least two first active area electrodes coupled to the first portion of the electroactive polymer, and a support structure for securing and for directing a mechanical output derived from the electroactive polymer wherein said power shaft includes a stall position that is maintained with substantially no electrical current to said first active area electrodes.

* * * * *